(12) United States Patent
Kim et al.

(10) Patent No.: US 8,755,798 B2
(45) Date of Patent: Jun. 17, 2014

(54) METHOD AND APPARATUS FOR TRANSCEIVING DATA IN A WIRELESS ACCESS SYSTEM

(75) Inventors: Jeongki Kim, Anyang-si (KR); Youngsoo Yuk, Anyang-si (KR); Kiseon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 23 days.

(21) Appl. No.: 13/700,403

(22) PCT Filed: May 27, 2011

(86) PCT No.: PCT/KR2011/003935
§ 371 (c)(1),
(2), (4) Date: Dec. 28, 2012

(87) PCT Pub. No.: WO2011/149318
PCT Pub. Date: Dec. 1, 2011

(65) Prior Publication Data
US 2013/0252610 A1  Sep. 26, 2013

Related U.S. Application Data

(60) Provisional application No. 61/348,744, filed on May 27, 2010.

(51) Int. Cl.
*H04W 68/00* (2009.01)
(52) U.S. Cl.
USPC .......................... 455/435.1; 370/338; 370/336
(58) Field of Classification Search
CPC ..... H04W 60/04; H04W 76/02; H04W 16/14; H04W 48/16; H04W 8/183; H04W 84/18; H04W 84/12; H04W 28/04
USPC ............ 455/450, 435.1, 435.2; 370/338, 336, 370/345, 350
See application file for complete search history.

(56) References Cited

U.S. PATENT DOCUMENTS

2011/0310854 A1* 12/2011 Zou et al. ...................... 370/336
2012/0044915 A1* 2/2012 Oerton .......................... 370/338

FOREIGN PATENT DOCUMENTS

KR   10-0792707   1/2008

OTHER PUBLICATIONS

Zte, et al., "MTC Traffic Modeling Considerations", 3GPPTSG-RANWG2#69, R2-101090, Feb. 2010.
Huawei, "Traffic Model for M2M Services", 3GPP TSG-RAN WG2 Meeting #69, R2-101184, Feb. 2010.

* cited by examiner

*Primary Examiner* — Phuoc H Doan
(74) *Attorney, Agent, or Firm* — Lee, Hong, Degerman, Kang & Waimey

(57) ABSTRACT

The present invention relates to a method in which an M2M device transceives data to/from a base station in a wireless access system. The method comprises: a step of receiving, from the base station, a first message containing an available interval or an M2M device ID shared among M2M devices, and an M2M device ID use period in which said available interval periodically repeats; and a step of transceiving data to/from the base station using the M2M device ID in the available interval.

31 Claims, 32 Drawing Sheets

METHOD AND APPARATUS FOR TRANSCEIVING DATA IN A WIRELESS ACCESS SYSTEM

CROSS-REFERENCE TO RELATED APPLICATIONS

This application is the National Stage filing under 35 U.S.C. 371 of International Application No. PCT/KR2011/003935, filed on May 27, 2011, which claims the benefit of U.S. Provisional Application Ser. No. 61/348,744, filed on May 27, 2010, the contents of which are all hereby incorporated by reference herein in their entirety.

BACKGROUND OF THE INVENTION

1. Field of the Invention

The present invention relates to a wireless access system, and more particularly, to a method and apparatus for transmitting/receiving data by a machine to machine de\\(M2M) device to/from a base station.

2. Related Art

Machine to Machine (M2M) Communication, Machine Type Communication (MTC)

Hereinafter, M2M will be described in brief.

Machine to Machine (M2M) communication implies communication between one electronic apparatus and another electronic apparatus. That is, it implies communication between objects. Although the M2M communication generally implies wired or wireless communication between electronic apparatuses or communication between a human-controlled apparatus and a machine, it may particularly imply communication between one electronic apparatus and another electronic apparatus, that is, wireless communication between machines. In addition, M2M devices used in a cellular network have performance or capability inferior to that of typical devices.

A great number of devices exist in a cell. The devices can be distinguished from each other according to a type, class, service type, etc., of the devices. In particular, when M2M communication (or MTC communication) is considered, the total number of devices may be rapidly increased. The M2M devices may have the following features according to a supported service.

1. A great number of devices in a cell
2. A small data amount
3. Infrequent transmission (it may have periodicity)
4. A limited number of data features
5. Insensitive to latency
6. Having low mobility or being fixed In order to allocate downlink or uplink resources to M2M devices, a base station needs to know a type of the device. In an M2M system, there may be a greater number of (i.e., about hundreds or thousands of) devices in a cell than those in conventional system (i.e., 802.16e or 802.16m).

If such a great number of devices exist in the cell, an addressing mechanism (i.e., 12-bit STID) used in the conventional system may not be enough to accommodate the greater number of devices.

SUMMARY OF THE INVENTION

The present invention aims to transmit information related to an available interval of a machine to machine (M2M) device identifier (ID) shared between M2M devices.

The present invention also aims to define a procedure related to an operation for using an M2M device ID in an unavailable interval of an M2M device ID.

The present invention also aims to define a procedure related to an operation for terminating an available interval of an M2M device ID.

The present invention also aims to define a procedure related to an operation for extending an available interval of an M2M device ID.

The present invention also aims to provide a method of using an M2M device ID among M2M devices by using a token ring mechanism.

According to one aspect of the present invention, a method in which a machine to machine (M2M) device transmits/receives data to/from a base station in a wireless communication is provided. The method includes receiving from the base station a first message including an available interval for an M2M device identifier (ID) shared among M2M devices and an M2M device ID use cycle indicating a duration in which the available interval is periodically repeated, and transmitting/receiving data to/from the base station by using the M2M device ID in the available interval.

In the aforementioned aspect of the present invention, the method may further include allocating the M2M device ID by the base station.

In addition, the first message may be received from the base station when the M2M device ID is allocated by the base station.

In addition, the first message may be received through an initial network entry procedure performed with respect to the base station, and may be a registration response (REG-RSP) message or a subscriber station basic capability negotiation response (SBC-RSP) message.

In addition, the first message may further include offset information indicating a use start time of the M2M device ID.

In addition, the M2M device ID use cycle may consist of an available interval and an unavailable interval of the M2M device ID.

In addition, the available interval may be classified into a Type-1 available interval indicating a fixed-sized available interval and a Type-2 available interval indicating a flexible-sized available interval.

In addition, the available interval may consist of a basic available interval and an extended available interval.

In addition, the method may further include terminating the available interval, wherein the available interval is terminated after a pre-set time expires or when a second message indicating the termination of the available interval is received from the base station.

In addition, the method may further include receiving a signal for reporting the start of the available interval of the M2M device ID from the base station in the unavailable interval, wherein the signal for reporting the start of the available interval includes information indicating the available interval of the M2M device ID and a type of the available interval.

In addition, the method may further include transmitting a signal for requesting the start of using the M2M device ID from the base station in the unavailable interval, and receiving a response signal for the request from the base station.

In addition, the response signal may further include response code information indicating rejection or acceptance to the request.

In addition, if the response signal indicates the rejection to the request, the response signal may further include information indicating any one of a connected mode, a sleep mode, and an idle mode until a next response signal is transmitted.

In addition, if the response signal indicates any one of the sleep mode and the idle mode, the response signal may further include information indicating a transmission time of the next-transmitted response signal.

In addition, if the response signal indicates the acceptance to the request, the response signal may further include the available interval of the M2M device ID, a start time of the available interval and type information of the available interval.

In addition, the method may further include receiving a signal indicating extension of the available interval from the base station.

In addition, the method may further include transmitting a signal for requesting the extension of the available interval to the base station, and receiving a response signal for the extension request signal from the base station.

In addition, the extension indication signal or the response signal for the extension request signal may include information indicating a termination time of the extended available interval.

In addition, the method may further include transmitting a link status check request signal for requesting the de-allocation of the M2M device ID to the base station in the available interval, and de-allocating the M2M device ID in the available interval.

In addition, the method may further include receiving a response signal for the link status check request signal from the base station.

In addition, the method may further include receiving an available interval (AI) extension notification A-MAP information element (IE) from the base station by using an idle time located before or after the M2M device ID use cycle.

In addition, the AI extension notification A-MAP IE further may include operation code information indicating whether the M2M device ID is used during a part or entirety of the available interval.

In addition, if the operation code information indicates that the M2M device ID cannot be used during the part of the available interval, the AI extension notification A-MAP IE may further include extension end time information indicating an interval in which the M2M device ID cannot be used.

In addition, the method may further include: determining a primary available interval and a secondary available interval on the basis of the received first message; and receiving a MAP IE including an M2M device ID indicator by using at least one of the determined primary available interval and secondary available interval, wherein the M2M device ID indicator is information indicating that the MAP IE is for an M2M device belonging to the primary available interval or an M2M device belonging to the secondary available interval.

According to another aspect of the present invention, a method in which an M2M device transmits/receives data to/from a base station in a wireless communication is provided. The method includes: receiving from the base station an REG-RSP message including an M2M device ID shared among M2M devices and type information of the M2M device ID; transmitting to the base station a first message for requesting the start of using the M2M device ID; and receiving from the base station a second message including operation code information for indicating acceptance or rejection to the first message.

In the aforementioned aspect of the present invention, if the operation code information indicates the acceptance, the second message may include available interval information of the M2M device ID.

In addition, if the operation code information indicates the rejection, the second message may include information indicating a time at which the M2M device ID cannot be used.

In addition, the method may further include receiving from the base station a third message including M2M device ID status information indicating whether the M2M device ID is used by a different M2M device.

In addition, the third message may be periodically broadcast.

In addition, if the M2M device ID status information indicates that the M2M device ID is currently used by the different M2M device, the third message may include information indicating a time at which the M2M device ID cannot be used.

In addition, the M2M device ID status information may be multicast for each M2M device ID or for each M2M device ID group.

According to the present invention, a method for effectively allocating a machine to machine (M2M) device identifier (ID) to an M2M device and for effectively managing the allocated M2M device ID is used to reduce waste of the M2M device ID allocated to the M2M device for which traffic is generated with respect to a base station only in a specific period of time.

In addition, according to the present invention, an M2M device ID is allocated by considering a status of an M2M device so that the M2M device ID can be used by other M2M devices.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e.

The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the LTE.

For clarity, the following description will focus on IEEE 802.16m. However, technical features of the present invention are not limited thereto.

Figure 1:
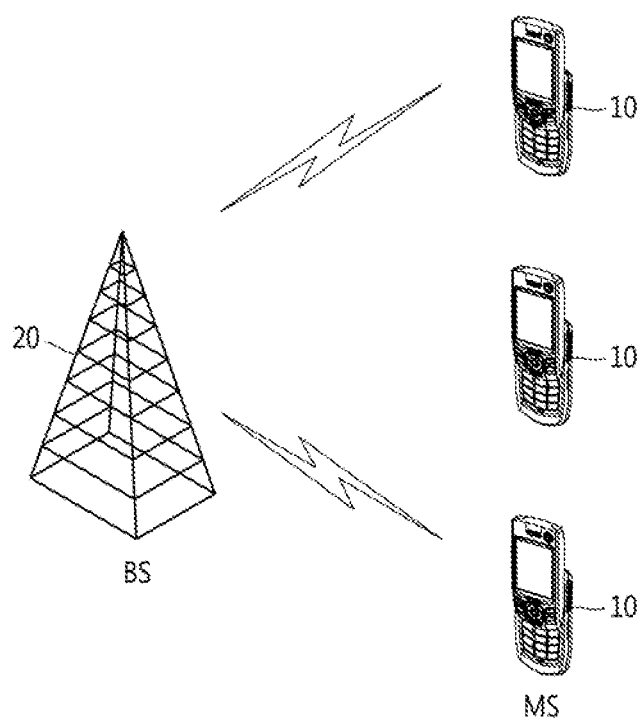
FIG. 1 shows a wireless communication system according to an exemplary embodiment of the present invention.

FIG. 1 shows a wireless communication system according to an exemplary embodiment of the present invention. The wireless communication system can be widely deployed to provide a variety of communication services, such as voices, packet data, etc.

Referring to FIG. 1, the wireless communication system includes a mobile station (MS) 10 and a base station (BS) 20. The MS 10 may be fixed or mobile, and may be referred to as another terminology, such as a user equipment (UE), a user terminal (UT), a subscriber station (SS), a wireless device, an advanced mobile station (AMS), etc. Further, the MS 10 may be a machine to machine (M2M) device supporting M2M communication.

The BS 20 is generally a fixed station that communicates with the MS 10 and may be referred to as another terminology, such as a node-B, a base transceiver system (BTS), an access point, etc. There may be one or more cells within the coverage of the BS 20.

The wireless communication system may be a system based on orthogonal frequency division multiplexing (OFDM)/orthogonal frequency division multiple access (OFDMA).

The OFDM uses a plurality of orthogonal subcarriers. The OFDM uses an orthogonality between inverse fast Fourier transform (IFFT) and fast Fourier transform (FFT). A transmitter transmits data by performing IFFT on the data. A receiver restores original data by performing FFT on a received signal. The transmitter uses IFFT to combine the plurality of subcarriers, and the receiver uses FFT to split the plurality of subcarriers.

In addition, a slot is a minimum possible data allocation unit, and is defined with a time and a subchannel. In an uplink, a plurality of tiles may construct the subchannel. Six tiles may construct the subchannel. In the uplink, three OFDM symbols and one subchannel may construct one burst.

In case of partial usage of subchannels (PUSC) permutation, each tile may include four contiguous subcarriers on three OFDM symbols. Optionally, each tile may include three contiguous subcarriers on three OFDM symbols. A bin includes 9 contiguous subcarriers on an OFDM symbol. A band denotes a group of four rows of the bin. Six contiguous bins construct an adaptive modulation and coding (AMC) subchannel in the same band.

Figure 2:
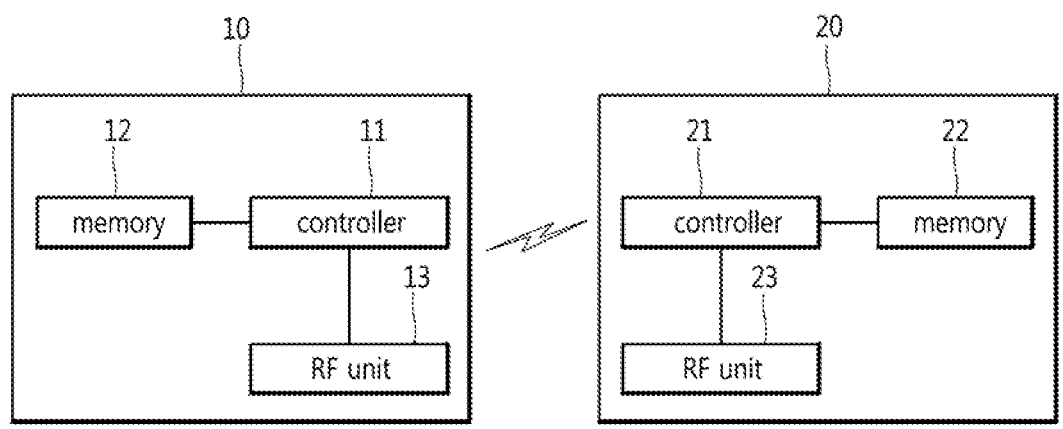
FIG. 2 is a block diagram showing internal structures of a mobile station (MS) and a base station (BS) in a wireless access system according to an embodiment of the present invention.

FIG. 2 is a block diagram showing internal structures of an MS and a BS in a wireless access system according to an embodiment of the present invention.

An MS 10 includes a controller 11, a memory 12, and a radio frequency (RF) unit 13.

Further, the MS also includes a display unit, a user interface unit, etc.

The controller 11 implements the proposed functions, procedures, and/or methods. Layers of a wireless interface protocol may be implemented by the controller 11.

The memory 12 is coupled to the controller 11, and stores a protocol or parameter for performing wireless communication. That is, the memory 12 stores an operating system of the MS, an application, and a general file.

The RF unit 13 is coupled to the controller 11, and transmits and/or receives an RF signal.

In addition, the display unit displays a variety of information of the MS, and may be a well-known element such as liquid crystal display (LCD), organic light emitting diodes (OLED), etc. The user interface unit may be constructed by combining well-known user interfaces such as a keypad, a touch screen, etc.

A BS 20 includes a controller 21, a memory 22, and an RF unit 23.

The controller 21 implements the proposed functions, procedures, and/or methods.

Layers of a wireless interface protocol may be implemented by the controller 21.

The memory 22 is coupled to the controller 21, and stores a protocol or parameter for performing wireless communication.

The RF unit 23 is coupled to the controller 21, and transmits and/or receives an RF signal.

The controllers 11 and 21 may include an application-specific integrated circuit (ASIC), a separate chipset, a logic circuit, and/or a data processing unit. The memories 12 and 22 may include a read-only memory (ROM), a random access memory (RAM), a flash memory, a memory card, a storage medium, and/or other equivalent storage devices. The RF units 13 and 23 may include a baseband circuit for processing an RF signal. When the embodiment of the present invention is implemented in software, the aforementioned methods can be implemented with a module (i.e., process, function, etc.) for performing the aforementioned functions. The module may be stored in the memories 12 and 22 and may be performed by the controllers 11 and 21.

The memories 12 and 22 may be located inside or outside the controllers 11 and 21, and may be coupled to the controllers 11 and 21 by using various well-known means.

Hereinafter, terminologies used in an M2M system will be summarized in brief.

(1) Machine-to-machine (M2M) communication: Information exchange executable without human intervention between user devices via a BS or between a server and a device in a core network via a BS.
(2) M2M ASN: An access service network capable of supporting an M2M service.
(3) M2M device: A terminal having (or supporting) an M2M function.
(4) M2M subscriber: A consumer of an M2M service.
(5) M2M server: An entity capable of communicating with an M2M device. The M2M server provides an interface accessible by an M2M subscriber.
(6) M2M feature: A unique feature of an M2M application supported by an M2M ASN. One or more features may be necessary to support the application.
(7) M2M group: A group of M2M devices including common and/or identical M2M subscribers, i.e., sharing one or more features.

Definition on M2M Group ID (MGID) and M2M Terminal (or Device) ID (MDID)

A first identifier for indicating an M2M group to which respective M2M devices belong and a second identifier for identifying the M2M devices belonging to the M2M group are allocated to the M2M devices in a system supporting M2M communication.

Herein, the first identifier is an identifier used to identify each M2M group in a cell, and the second identifier is an identifier used to identify each M2M device in a group to which the M2M device belongs. That is, the first identifier can be expressed as an M2M group ID, and the second identifier can be expressed as an M2M device ID.

In addition, the first identifier may be used as a primary M2M device ID, and the second identifier may be used as a secondary M2M device ID.

Hereinafter, for convenience of explanation, the first identifier is used as the M2M group ID, and the second identifier is used as the M2M device ID.

That is, the M2M group ID indicates an ID shared by one or more M2M devices, and the M2M device ID is used to identify devices which share the same MGID. If the MGID is allocated in a region of an STID used for a conventional 16 m device (i.e., a 12-bit masking code is used when masking prefix=0b0, Type indicator=0b000), the STID takes a role of a function of the MGID. That is, one STID can be shared and used by one or more devices. For convenience of explanation, the MGID will be used in the present invention.

That is, when initial network entry is performed, an M2M group ID and an M2M device ID to be used for communication with the BS are allocated to the M2M devices by a system supporting M2M communication. Herein, the system supporting M2M communication is the BS or a network entity connected to a network. For example, the network entity may be an M2M server.

Although a 802.16 (particularly, 16 m) system is taken as an example in the following description, the method of the present invention is not limited to the 802.16m system, and thus is apparently applied to a system such as LTE, LTE-A, etc.

Hereinafter, a method is described for effectively allocating an ID to M2M devices, for effectively managing the allocated ID, and for allocating a resource to the device by using the allocated ID in a wireless access system (e.g., 802.16 system) proposed in the present invention.

When installing the M2M device having a feature of no mobility and/or long term traffic generation, the M2M device may be first subjected to authentication and then be allocated an identifier by the BS. The M2M device transmits/receives traffic to/from the BS by using the ID allocated by the BS. The M2M device has no mobility or low mobility, and traffic is generated periodically with a long time interval. Therefore, the M2M device uses the ID only when traffic is generated at a determined time.

Accordingly, the BS or the M2M server can allocate a single ID to several devices, and the single ID allocated to the several devices is valid for specific M2M devices during a specific period of time. Therefore, the BS may report the M2M device about a specific time and a specific interval during which the ID allocated to the M2M device is valid, in a process of allocating the ID to the M2M device or in a network entry process of the M2M device.

Hereinafter, an available interval, an available duration, an AI, and an AD may be used for the same meaning.

Figure 3A:
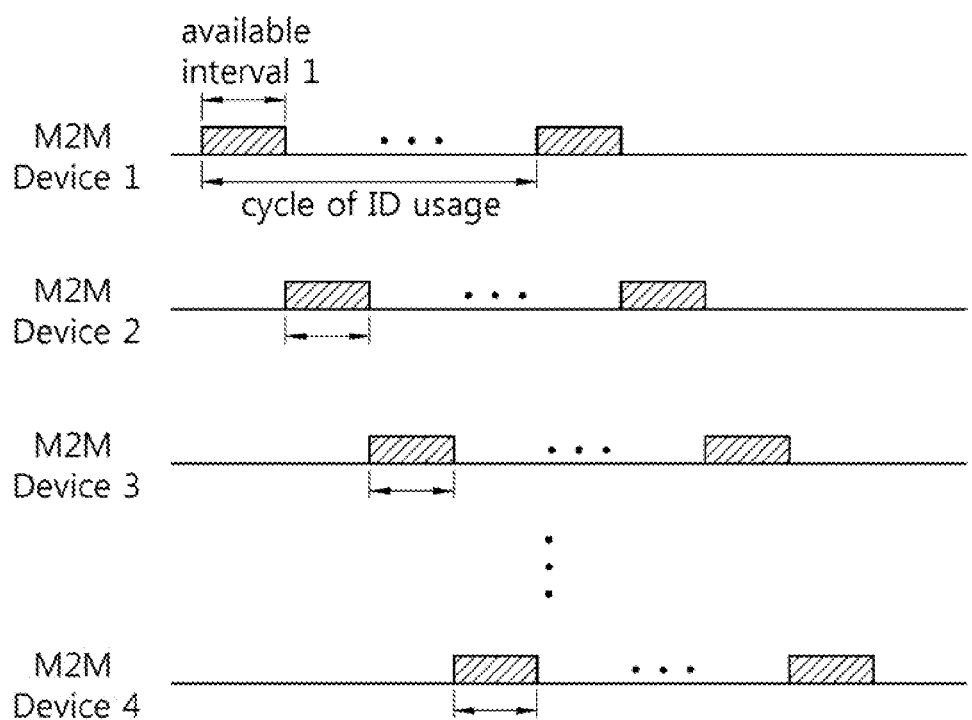
FIG. 3A shows an example of a cycle of identifier (ID) usage and an available interval of a machine to machine (M2M) device ID of each of M2M devices according to an embodiment of the present invention.

FIG. 3A shows an example of a cycle of ID usage and an available interval of an M2M device ID of each of M2M devices according to an embodiment of the present invention.

A BS determines a cycle of usage and an available interval of an M2M device ID(=1) and transmits them to each of M2M devices so that the respective M2M devices can share and use one M2M device ID(=1). That is, the respective devices transmit and receive data to and from the BS according to the available interval and cycle of usage transmitted from the BS.

As shown in FIG. 3A, an M2M device 1 can use the M2M device ID(=1) in an available interval 1. The available interval 1 is repeated in every cycle of ID usage. That is, in an interval other than the available interval 1, the M2M device 1 cannot use the ID(=1), and the ID(=1) is used for other M2M devices.

Herein, the AI may indicate a relative value indicating a specific time from a current time, or may indicate an actual transmission time of the AI.

In addition, the M2M device ID(=1) is valid for an M2M device 2 in an available interval 2, is valid for an M2M device 3 in an available interval 3, and likewise, is valid for an M2M device n in an available interval n.

Although an AI for each M2M device can be repetitively applied with a specific period (or cycle) as shown in FIG. 3A, the AI is not valid in an overlapping manner for each M2M device in a cell. Therefore, the BS reports the M2M device about an AI of an M2M device ID, an AI offset (i.e., a specific time at which the AI starts), and a cycle of ID usage (i.e., a specific period according to which the available interval of the M2M device ID is repeated).

In this case, the BS may report the M2M device about the AI, the AI offset, and the M2M device ID use cycle in a process of allocating the M2M device ID or in an initial network entry process.

The AI may be limited to a unit of superframe/frame/subframe. As such, when the AI is limited in a system, the BS may additionally report only the AI offset of the ID and the cycle of ID usage to the device, without the AI value. If the AI is limited to one subframe, the device is valid only in a specific subframe within one frame. If the AI is limited to one frame, it indicates that the ID usage is valid for the device only in a specific frame in the cycle of ID usage. If the AI is limited to one superframe, the ID is valid only in a specific superframe within the cycle of ID usage. As described above, a start point of a specific subframe/frame/superframe is indicated by using an ID use offset.

Figure 3B:
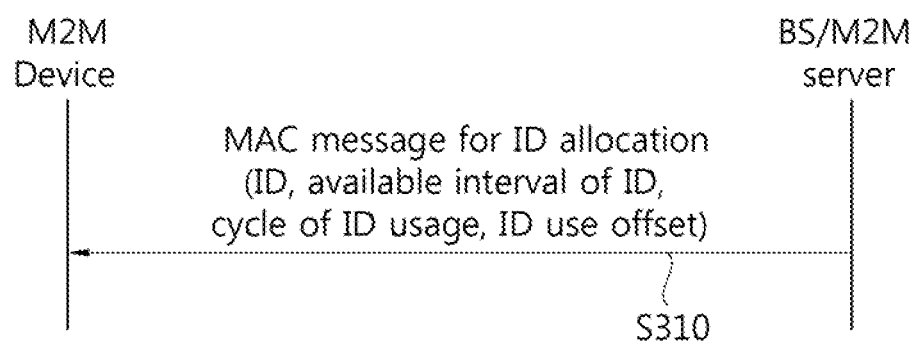
FIG. 3B shows an example of transmitting an available interval and an M2M device ID use cycle according to an embodiment of the present invention.

FIG. 3B shows an example of transmitting an available interval and an M2M device ID use cycle according to an embodiment of the present invention. Referring to FIG. 3B, when a BS allocates an M2M device ID, the available interval of the M2M device ID, the use cycle of the M2M device ID, and an ID use offset (i.e., an AI start position) are transmitted (step S310).

Figure 3C:
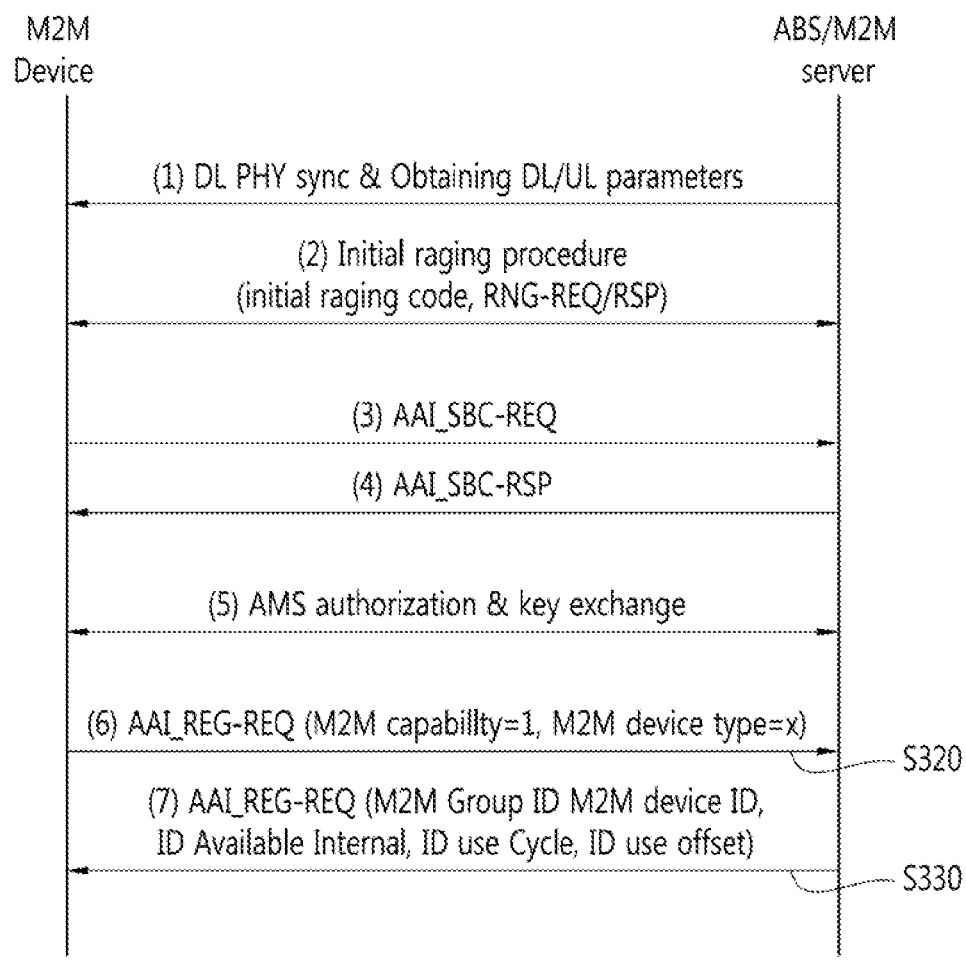
FIG. 3C shows an example of transmitting an available interval of an M2M device ID and an M2M device ID use cycle through registration during an initial network entry procedure according to an embodiment of the present invention.

FIG. 3C shows an example of transmitting an available interval of an M2M device ID and an M2M device ID use cycle through registration during an initial network entry procedure according to an embodiment of the present invention.

As shown in FIG. 3C, a BS (or M2M server) allocates an M2M device ID to an M2M device through a registration procedure performed with respect to the M2M device. That is, the BS transmits available interval information of the M2M device ID, an ID use offset, and information of an M2M device ID use cycle to the M2M device together with an M2M group ID and the M2M device ID by using a registration response message (i.e., REG-RSP) (step S330).

Herein, when transmitting a registration request message (i.e., AAI_REG-REQ) to the BS, the M2M device transmits the message to the BS by including information indicating a specific type of the M2M device (step S320). In this case, the BS allocates a proper ID to the M2M device on the basis of M2M device type information received from the M2M device.

Figure 3D:
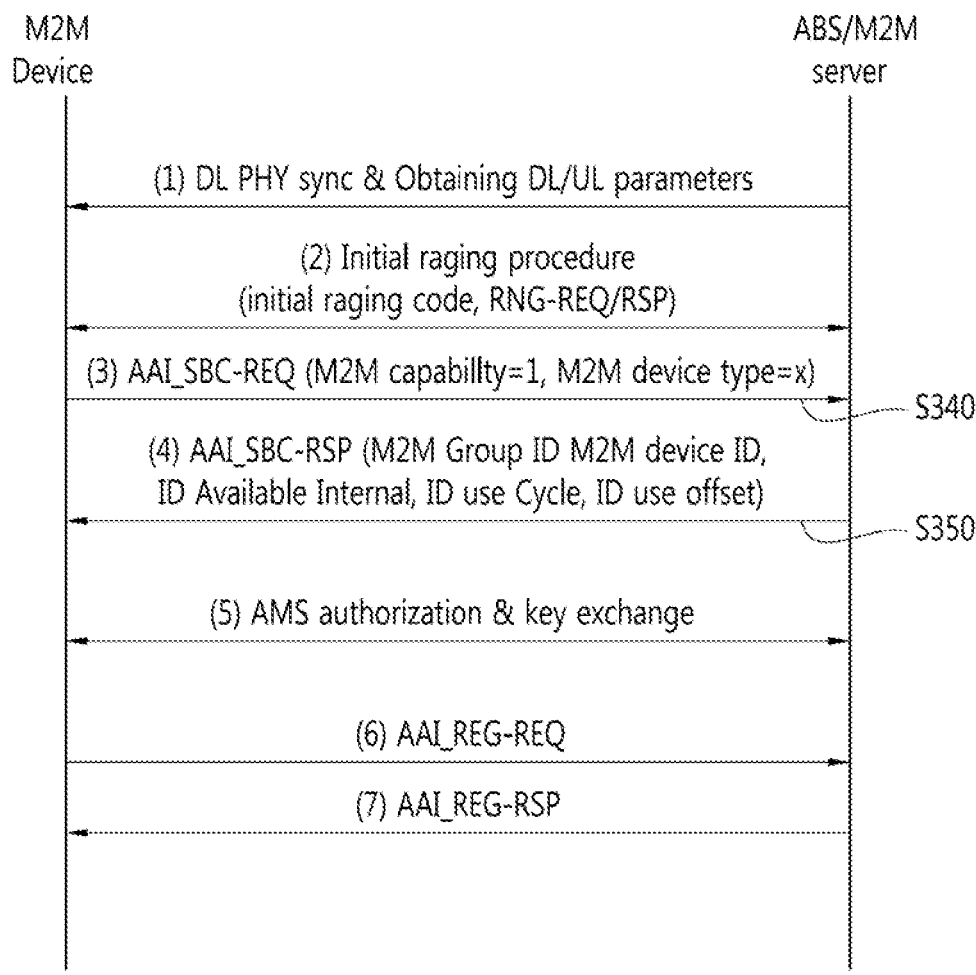
FIG. 3D shows an example of transmitting an available interval of an M2M device ID, an M2M device ID use cycle, and an ID use offset (i.e., an AI start position) through basic capability negotiation during an initial network entry procedure according to an embodiment of the present invention.

FIG. 3D shows an example of transmitting an available interval of an M2M device ID, an M2M device ID use cycle, and an ID use offset (i.e., an AI start position) through basic capability negotiation during an initial network entry procedure according to an embodiment of the present invention.

As shown in FIG. 3D, a BS can allocate an M2M device ID, an available interval, an ID usage cycle, and an ID use offset through a basic capability negotiation procedure performed with respect to an M2M device during an initial network entry procedure (step S340).

Herein, the M2M device transmits to the BS an SBC-REQ message including information indicating that it is the M2M device (M2M capability=1) and M2M device type information (M2M device type=x). Thereafter, the BS transmits an SBC-RSP message including the M2M group ID, the M2M device ID, the available interval, the ID use cycle, and the ID use offset to an M2M device which requests the SBC-REQ (step S350).

In addition to the aforementioned descriptions of FIG. 3B to FIG. 3D, the BS may report an M2M group ID and/or an M2M ID, an available duration (or interval) of an M2M device ID, and ID use cycle information to the M2M device by using another unicast message (e.g., PKM-REQ/RSP, new MAC control message, etc.). In case of using a new MAC control message, after completion of network entry, the M2M device can receive the new MAC control message from the BS.

Hereinafter, a type of an available interval (AI) will be described.

The AI can be classified into Type 1 indicating a fixed available interval and Type 2 indicating a flexible (or adaptive) available interval.

Figure 4A:
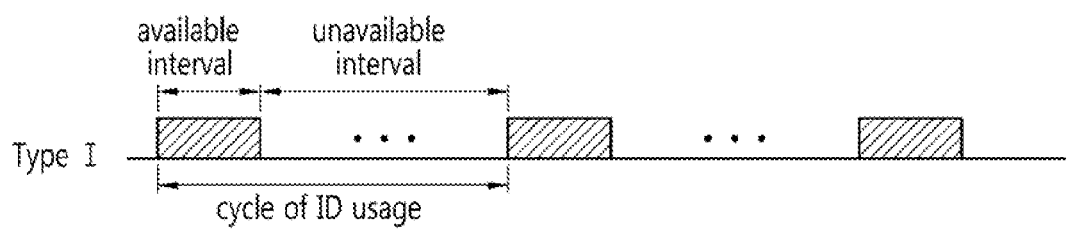
FIG. 4A shows a Type-1 available interval according to an embodiment of the present invention.

FIG. 4A shows a Type-1 available interval according to an embodiment of the present invention. As shown in FIG. 4A, a fixed-sized AI is repeated with a cycle ID usage.

Figure 4B:
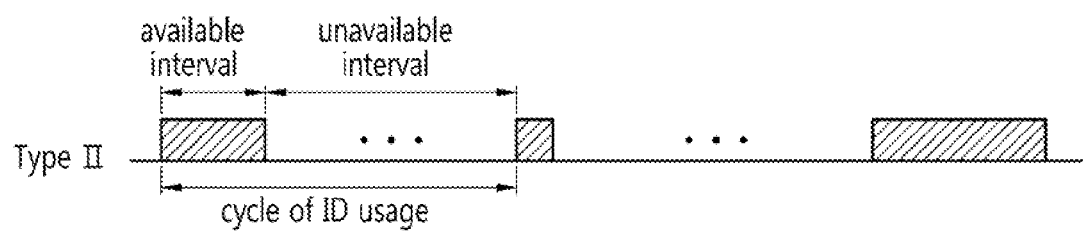
FIG. 4B shows a Type-2 available interval according to an embodiment of the present invention.

FIG. 4B shows a Type-2 available interval according to an embodiment of the present invention.

Referring to FIG. 4B, a cycle of an M2M device ID and a start point of an available interval are predetermined, and an end point of each AI differs for each available interval.

Hereinafter, an AI allocation method and an AI termination method will be described in detail.

Figure 5A:
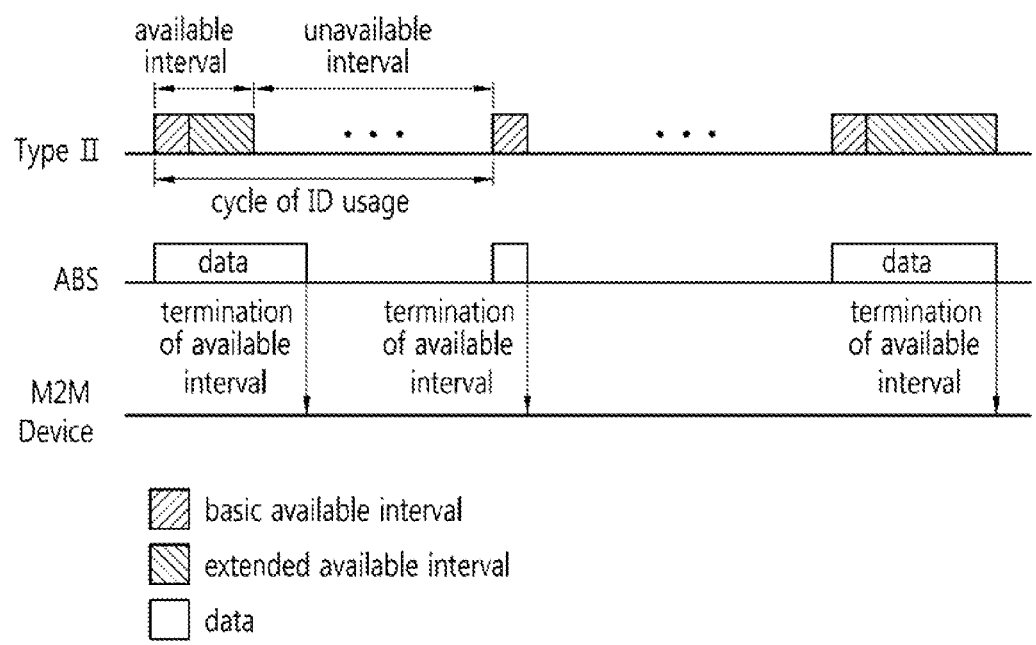
FIG. 5A shows a method of terminating an available interval of an M2M device ID according to an embodiment of the present invention.

FIG. 5A shows a method of terminating an available interval of an M2M device ID according to an embodiment of the present invention.

Even if a default AI is allocated to a device, if the device does not finish current data transmission, a BS may allow the device to maintain its ID in use.

When the BS allocates the M2M device ID to an M2M device, the BS allocates the default available interval, and the available interval is terminated by using an implicit method using a timer or an explicit method using a trigger of the BS.

Referring to FIG. 5A, after data transmission is finished between the M2M device and the BS, if a determined timer expires, the BS and the M2M device do not use the M2M device ID until a next cycle starts.

Alternatively, the BS transmits a signal for indicating the termination of the available interval to the M2M device. Herein, the signal for indicating the device of the available interval may be transmitted to the M2M device in a format such as a MAC message, an extended header, etc. Thereafter, the M2M device terminates the available interval, and has an unavailable interval. That is, if the available interval is terminated, the BS reports this to the M2M device, and when the signal for indicating the termination of the available interval is received from the BS, the M2M device determines that an M2M device ID allocated to itself is not valid and does not use the M2M device ID until a next cycle of ID usage.

Figure 5B:
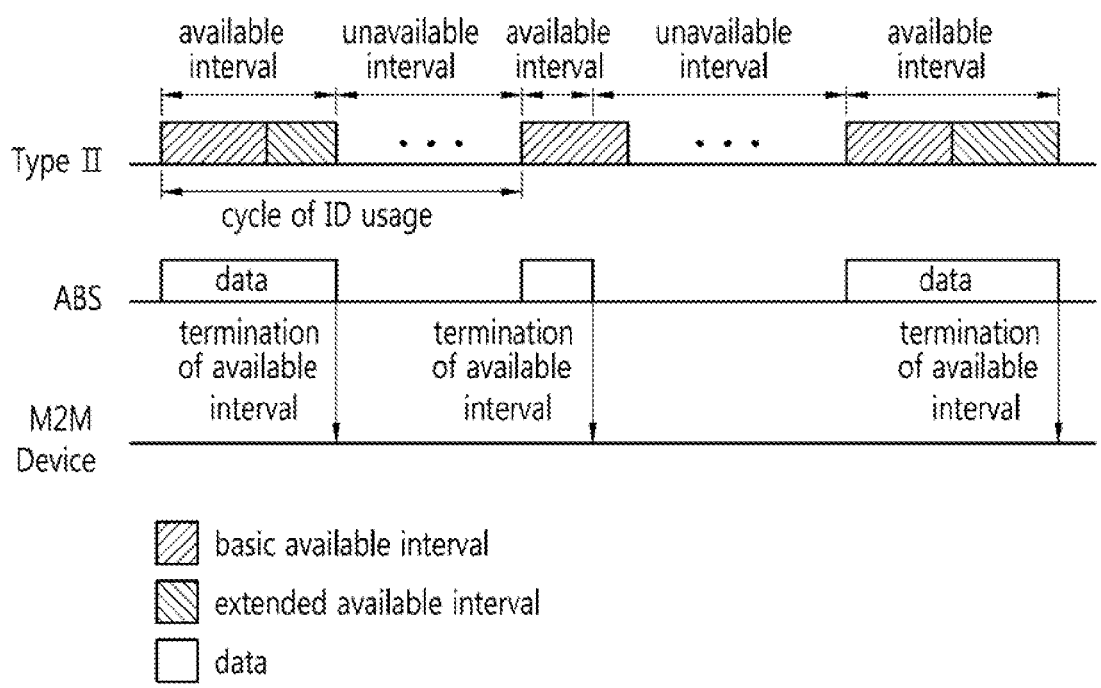
FIG. 5B shows a method of terminating an available interval in the middle of the available interval according to an embodiment of the present invention.

FIG. 5B shows a method of terminating an available interval in the middle of the available interval according to an embodiment of the present invention.

Referring to FIG. 5B, if a signal for indicating the termination of the available interval is received from a BS in the middle of a basic available interval, an M2M device stops the use of an M2M device ID allocated by the BS until a next available interval starts.

Hereinafter, a method of using an M2M device ID in an unavailable interval will be described.

The BS may report the start of the available interval of the M2M device ID to the M2M device in the middle of the unavailable interval. In this case, a valid duration of the available interval may be a basic available interval in an available interval (basic available interval+extended available interval) or the termination of the available interval may be determined by a trigger of the BS. That is, if the available interval is set as the basic available interval in the unavailable interval, the M2M device can know that the available interval is terminated, without having to receive any signal from the BS.

In addition, the BS may report an available interval type to the M2M device by including information used to indicate to which type the AI transmitted to the M2M device is determined between Type 1 and Type 2 when transmitting a signal for reporting the start of the available interval or when the BS allocates the AI, the ID use offset, and the ID use cycle.

Figure 6A:
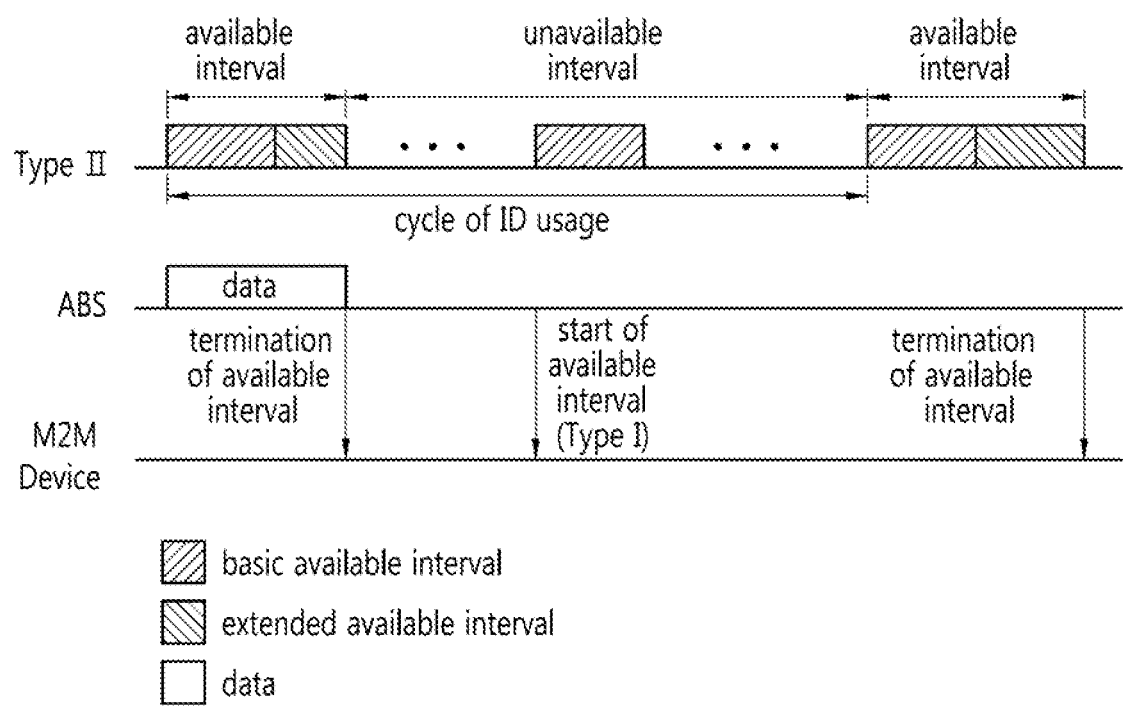
FIG. 6A shows a method of transmitting a signal for reporting an available interval to an M2M device by a BS during an unavailable interval together with type information of the available interval according to an embodiment of the present invention.

FIG. 6A shows a method of transmitting a signal for reporting an available interval to an M2M device by a BS during an unavailable interval together with type information of the available interval according to an embodiment of the present invention.

Referring to FIG. 6A, the available interval created in the middle of the unavailable interval is valid only during a basic available interval. That is, an M2M device ID is valid only during the basic available interval. That is, even in the unavailable interval of the M2M device ID of the M2M device, the BS transmits a signal for reporting the start of the available interval of the ID together with type information (=Type 1) of the AI.

Figure 6B:
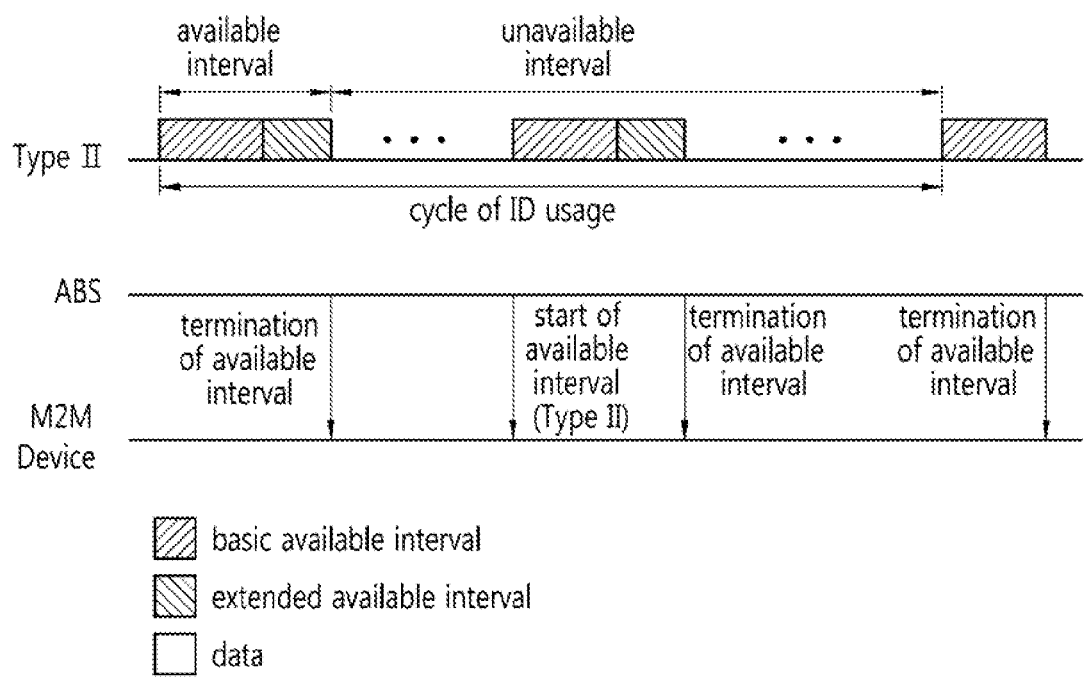
FIG. 6B shows another example of a method of transmitting a signal for reporting an available interval to an M2M device by a BS during an unavailable interval together with type information of the available interval according to an embodiment of the present invention.

FIG. 6B shows another example of a method of transmitting a signal for reporting an available interval to an M2M device by a BS during unavailable interval together with type information of the available interval according to an embodiment of the present invention.

Referring to FIG. 6B, the available interval created in the middle of the unavailable interval is valid until the BS transmits a signal for reporting the termination of the available interval to the device. That is, an M2M device ID is valid only during (basic available interval+extended available interval). The M2M device can use the M2M device ID until the signal for reporting the termination of the available interval is received from the BS in the extended available interval.

In addition, in FIG. 6B, the BS can report the start of the available interval to the M2M device by using a unicast message or a broadcast message (e.g., paging messages, other broadcast MAC messages).

Hereinafter, a method of starting an available interval at the request of an M2M device in an unavailable interval will be described. In general, the start of the available interval of the device ID can be applied directly after registration ends. That is, right after receiving information on an ID and an ID use interval through a registration procedure, the device can use the information. In addition to this method, the start of the available interval can be reported through signaling transmission and reception with respect to the BS when the device desires to use the ID. A method of triggering by the device will be described below.

Figure 7A:
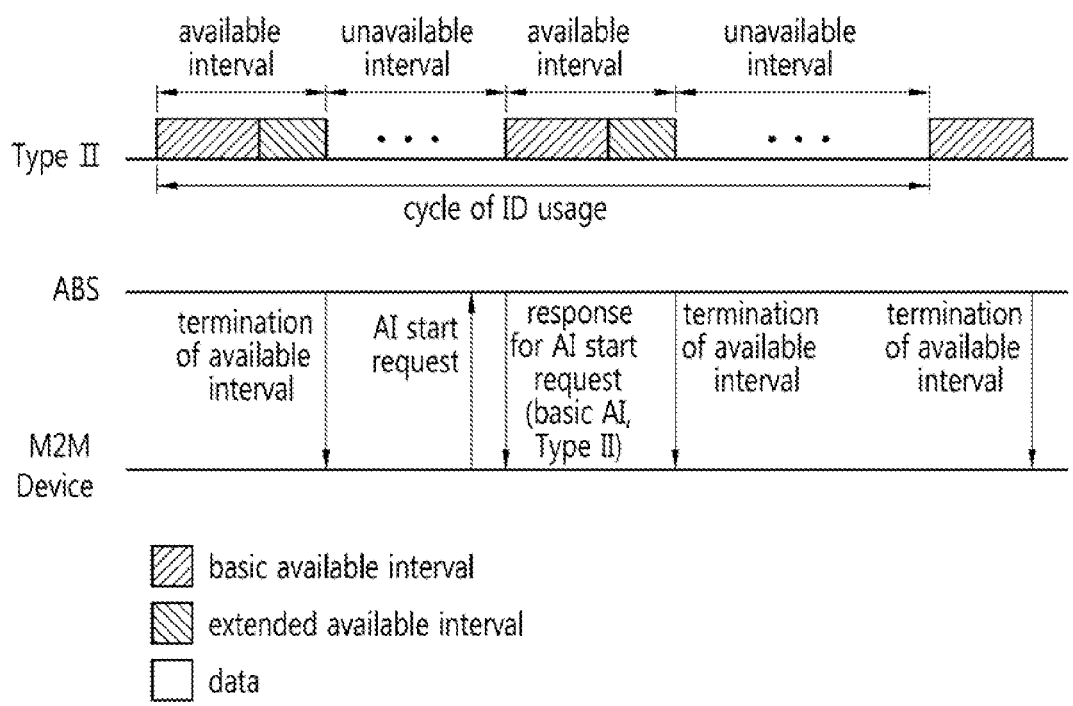
FIG. 7A shows an available interval request and response procedure between an M2M device and a BS during an unavailable interval of an M2M device ID according to an embodiment of the present invention.

FIG. 7A shows an available interval request and response procedure between an M2M device and a BS during an unavailable interval of an M2M device ID according to an embodiment of the present invention.

Referring to FIG. 7A, the M2M device transmits a signal for requesting the start of M2M device ID use (or the start of available interval) to the BS when the M2M device intends to use the M2M device ID allocated by the BS in the unavailable interval.

Upon receiving a signal (e.g., MAC message) for reporting the start of M2M device ID use from the M2M device during the unavailable interval of the M2M device, the BS transmits a response signal to the M2M device. The response signal may include a basic available interval and an available interval type. At a time when the M2M device requests the available interval of the M2M device ID, if another M2M device is scheduled to use or is using the same M2M device ID, the BS transmits to the M2M device which requests the available interval of the M2M device ID by including information for rejecting an AI start request to the response signal.

When the M2M device receives a rejection signal for the AI request from the BS, the M2M device waits until receiving a response for reporting the start of the available interval from the BS. Alternatively, on the basis of information indicating a transmission time of a next response and included in the rejection signal, a corresponding response message is received from the BS at a transmission time of a response for reporting the start of the available interval. In this case, the M2M device can remain in a state of a sleep mode or an idle mode until a next response message is received from the BS.

Figure 7B:
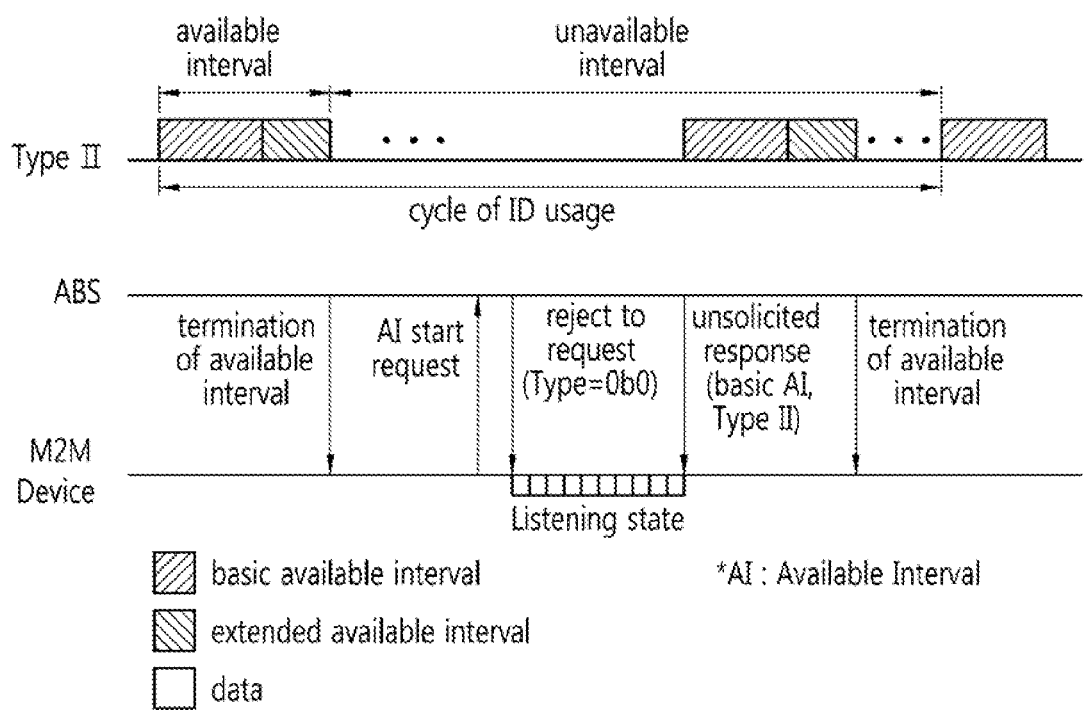
FIG. 7B shows a case in which a listening state is maintained in a connected mode until a response for rejection is received from a BS and then a next response is received, after requesting an available interval of an M2M device ID during an unavailable interval of the M2M device ID according to an embodiment of the present invention.

FIG. 7B shows a case in which a listening state is maintained in a connected mode until a response for rejection is received from a BS and then a next response is received, after requesting an available interval of an M2M device ID during an unavailable interval of the M2M device ID according to an embodiment of the present invention.

Referring to FIG. 7B, when an M2M device receives a rejection response for an AI start request from the BS, if a reject type is '0b0' for example, the M2M device remains in a listening (or connected) state until a next unsolicited response message is received from the BS. Thereafter, the M2M device can know its M2M device ID valid time by using a basic available interval and type information of the basic available interval included in the unsolicited response message received from the BS.

Figure 7C:
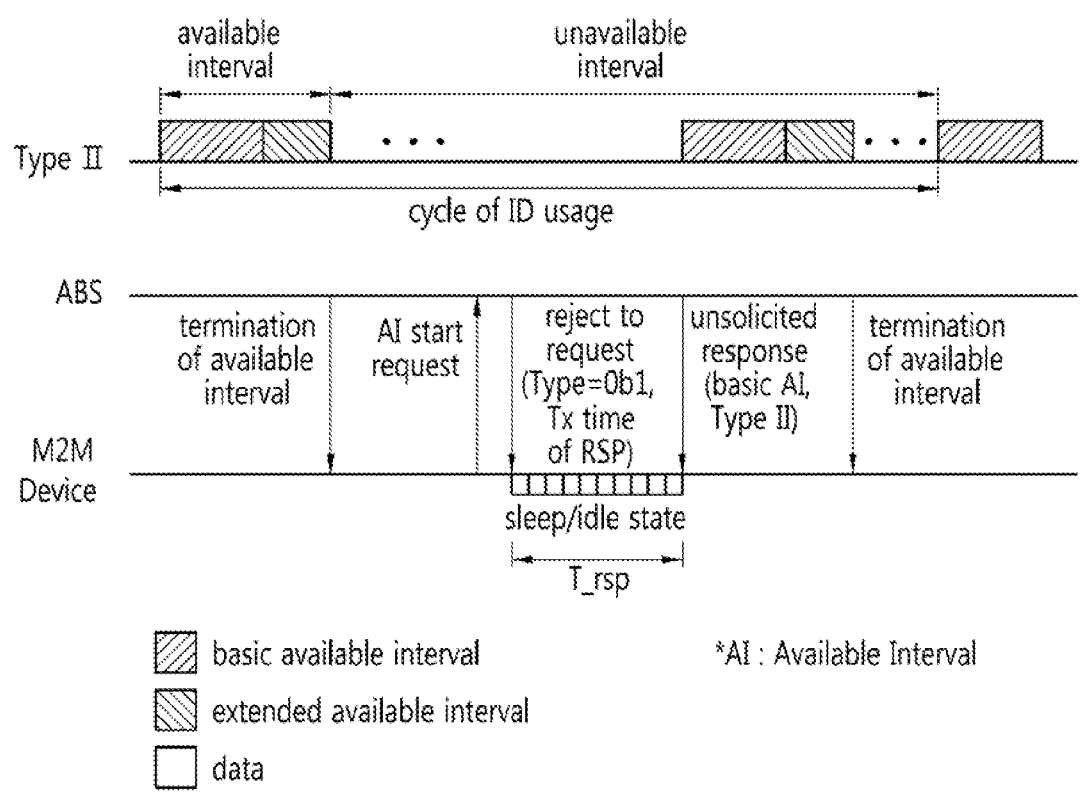
FIG. 7C shows a case in which, after an M2M device requests an available interval of an M2M device ID during an unavailable interval of the M2M device ID, the M2M device remains in a sleep or idle state until a response for rejection is received from a BS and then a next response is received according to an embodiment of the present invention.

FIG. 7C shows a case in which, after an M2M device requests an available interval of an M2M device ID during an unavailable interval of the M2M device ID, the M2M device remains in a sleep or idle state until a response for rejection is received from a BS and then a next response is received according to an embodiment of the present invention.

Referring to FIG. 7C, when the M2M device receives a rejection response for an AI start request from the BS, if a rejection type is '0b1' for example, the M2M device remains in a sleep or idle state until a next unsolicited response message is received on the basis of information indicating a transmission time of a next unsolicited response message included the response.

Hereinafter, a request operation of an M2M device for starting an available interval and its related content will be described in detail.

First, the M2M device transmits a random access code for requesting an uplink resource to a BS to transmit an AI start request signal. For example, the random access code may be a bandwidth request (BR) code or a random access channel (RACH).

The BS receives the random access code from the M2M device, and thereafter allocates an uplink (UL) grant to the device so that the device can transmit information related to an M2M device ID request.

Thereafter, when the BS allocates the resource to the M2M device which transmits the random access code to the BS, the M2M device transmits information regarding the available interval start request to the BS. For example, the information regarding the AI start request may be M2M group ID or M2M device ID information.

In addition, the M2M device may transmit the information to the BS by using a signaling header, an extended header, a MAC control message, etc.

Thereafter, on the basis of the AI start request information received from the M2M device, the BS determines whether to accept the available interval start request for the M2M device ID. That is, the BS may accept or reject the request. After determining whether to accept the request, the BS transmits a response signal to the M2M device.

The response signal may include an available interval of the M2M device ID. In addition, the BS may allow the response signal to include information indicating whether the M2M device ID is valid during a basic available interval or until a termination time of the available interval by transmitting an explicit termination signal to the device.

Table 1 below shows an example of an AI request message (AAI_ID-AI-REQ_Message) format of an M2M device ID according to an embodiment of the present invention.

TABLE 1

| Syntax | Size (bit) | Notes |
|---|---|---|
| AAI_ID-AI-REQ_Message_Format( ) { | | |
| MAC Control Message Type | 8 | AAI_ID-AI-REQ |
| M2M Group ID | | |
| M2M Device ID | | |
| } | | |

Table 2 below shows an example of an AI response message (AAI_ID-AI-RSP_Message) format of an M2M device ID according to an embodiment of the present invention.

TABLE 2

| Syntax | Size (bit) | Notes |
|---|---|---|
| AAI_ID-AI-RSP_Message_Format( ) { | | |
| MAC Control Message Type | 8 | AAI_ID-AI-RSP |
| Response code | 2 | 0b0: Reject to AAI_ID-AI-REQ. 0b1: Accept of AAI_ID-AI-REQ or Unsolicited response |
| If (Action code == 0b0) { | | |
| Type | 1 | Action of the device to receive AAI_ID-AI-RSP at a later time, when the device which transmits the request is rejected. 0b0: The device waists in a connected state until a next response is received. 0b1: The device can enter an idle or sleep state until a next response is received. |
| If (type = 0b1) { | | |
| Tx time of next AAI_ID-AI-RSP | TBD | Time at which a next response message is transmitted |
| } | | |
| } else { | | |
| Start time of ID available interval | | Time at which an ID available interval starts |
| Basic Available Interval | TBD | Duration in which ID is available |
| AI type | 1 | 0b0: ID is valid only during a basic available interval. 0b1: ID is valid until a signal (message or extension header) indicating the termination of an available interval is received from BS |
| } | | |
| } | | |

Hereinafter, extension of an available interval will be described.

That is, on the basis of a basic available interval which is a valid duration for the use of an M2M device ID, a method is described in which a corresponding available interval is early terminated or extended according to whether a device uses data.

After a BS allocates the basic available interval to the M2M device, the BS and the M2M device use the allocated M2M device ID during the basic available interval. In this case, the basic available interval can be extended at the request of the M2M device or at the request of the BS. That is, the BS can autonomously instruct the M2M device to extend the available interval. The M2M device can report or request the available interval expansion to the BS. Upon receiving the AI expansion request from the M2M device, the BS responds to the device. However, if there is no signal transmission and reception for the AI expansion between the BS and the M2M device, the available interval allocated to the M2M device is valid until the basic available interval.

Figure 8A:
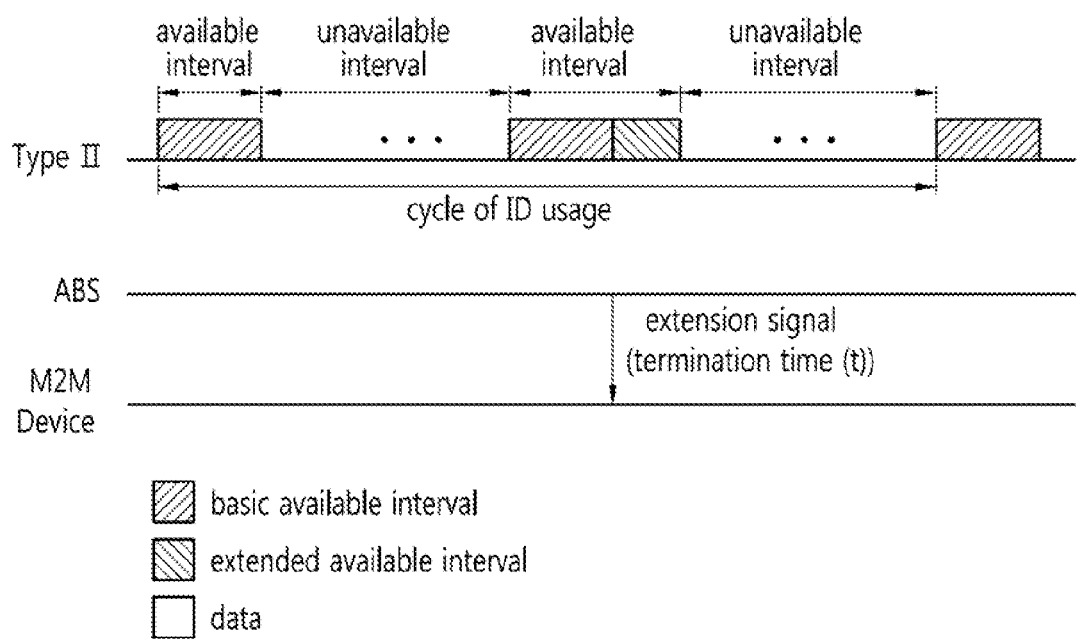
FIG. 8A shows an example of available interval extension at the request of a BS according to an embodiment of the present invention.

FIG. 8A shows an example of available interval extension at the request of a BS according to an embodiment of the present invention.

Referring to FIG. 8A, the BS transmits a signal for requesting AI extension to an M2M device in an AI interval. In a primary basic available interval, there is no signal regarding extension between the BS and the M2M device. Therefore, the available interval is terminated after the basic available interval is terminated. In a secondary available interval, the BS transmits a signal indicating AI extension to the M2M device. In this case, the secondary available interval is extended, and information indicating until when the available interval is extended, that is, information indicating the AI expansion interval, is transmitted to the device by being included in the signal for reporting the AI expansion.

Figure 8B:
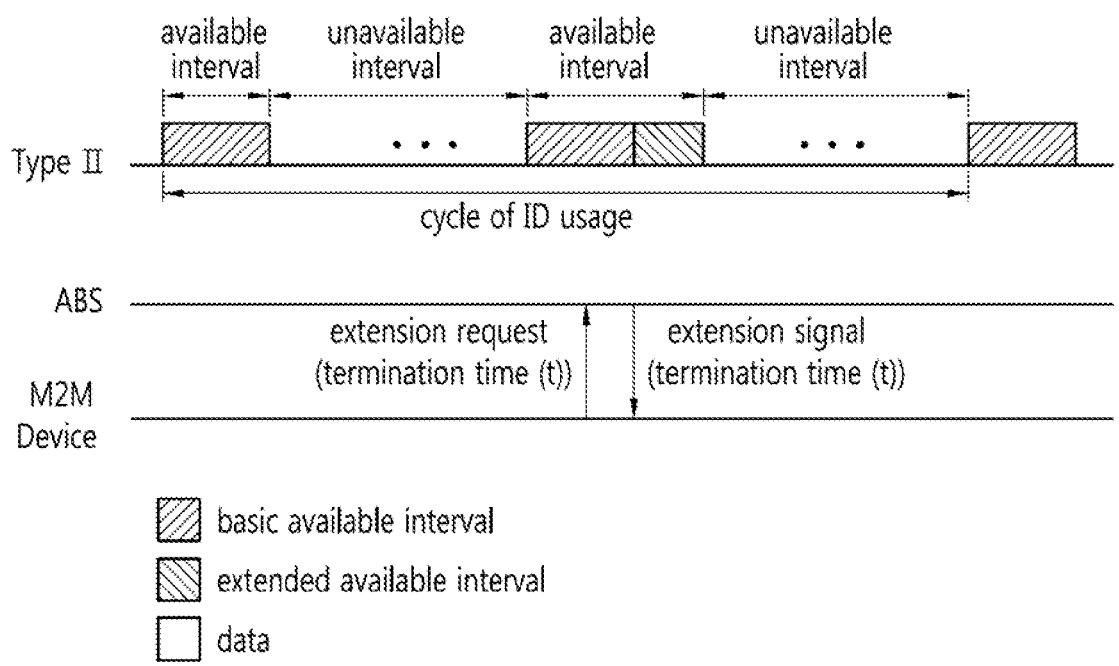
FIG. 8B shows an example of available interval extension at the request of an M2M device according to an embodiment of the present invention.

FIG. 8B shows an example of available interval extension at the request of an M2M device according to an embodiment of the present invention.

Referring to FIG. 8B, the M2M device transmits an AI extension request to a BS, then receives a response thereof from the BS, and then extends the AI. As shown in FIG. 8B, in a secondary basic available interval, the M2M device transmits a signal for requesting the extension of the available interval to the BS, and the BS transmits a response thereof to the device. In this case, information indicating the AI extension interval, that is, information indicating until when the AI is extended, is transmitted by being included in a signal transmitted and received by the device and the BS. Thereafter, the M2M device uses a corresponding M2M device ID by extending the available interval until a time corresponding to the AI extension interval.

Table 3 below shows an example of an available interval extension request message (AAI_AI-EXT-REQ Message) format according to an embodiment of the present invention.

TABLE 3

| Syntax | Size (bit) | Notes |
|---|---|---|
| AAI_AI-EXT-REQ_Message_Format( ) { | | |
| MAC Control Message Type | 8 | AAI_ID-AI-REQ |
| Extension flag | 1 | 0b0: Extension |
| | | 0b1: No Extension |
| If (extension flag = 0b01) { | | |
| Extension end time | Variable | Time at which extension of the available interval is terminated |
| } | | |
| } | | |

Table 4 below shows an available interval extension request message (AAI_AI-EXT-RSP Message) format according to an embodiment of the present invention. Herein, AAI_AI-EXT-RSP may be transmitted by the BS to the device in response to the AAI_AI-EXT-REQ message, or may be transmitted autonomously by the BS to the device to extend the available interval without the request of the device.

TABLE 4

| Syntax | Size (bit) | Notes |
|---|---|---|
| AAI_AI-EXT-RSP Message_Format( ) { | | |
| MAC Control Message Type | 8 | AAI_AI-EXT-RSP |
| Response code | 2 | 0b0: Reject to AAI_AI-EXT-REQ. |
| | | 0b1: Accept of AAI_AI-EXT-REQ or Unsolicited response |
| If (Action code == 0b0) { | | |
| Type | 1 | Action of the device to receive AAI_ID-AI-RSP at a later time, when the device which transmits the request is rejected. |
| | | 0b0: The device waists in a connected state until a next response is received. |
| | | 0b1: The device can enter an idle or sleep state until a next response is received. |

TABLE 4-continued

| Syntax | Size (bit) | Notes |
|---|---|---|
| If (type = 0b1) { | | |
| Tx time of next AAI_AI-EXT-RSP | TBD | Time at which an ID available interval starts |
| } | | |
| } else { | | |
| Extension flag | 1 | 0b0: No Extension |
| | | 0b1: Extension |
| If (extension flag = 0b01) { | | |
| Extension end time | Variable | Time at which extension of the available interval is terminated |
| } | | |
| } | | |
| } | | |

Information included in the aforementioned MAC messages (AAI_AI-EXT-REQ/RSP, AAI_ID-AI-REQ/RSP message) may be exchanged between the BS and the device by being included in different formats such as an extended header, a signaling header, etc.

Method of De-Allocating M2M Device ID

Hereinafter, a method of de-allocating an M2M device ID allocated to an M2M device will be described in detail.

The M2M device ID allocated to the M2M device is semi-permanently allocated in an available interval of each M2M device irrespective of a state (i.e., connected, sleep, idle) of the M2M device. Therefore, a method of de-allocating the M2M device ID allocated to the M2M device is provided when communication cannot be performed between the BS and the device during the M2M device ID is valid.

The method of de-allocating the M2M device ID allocated to the M2M device includes an implicit method and an explicit method.

First, in the implicit method, if the M2M device does not receive a signal (or data) from the BS during a specific period of time after a basic available interval of the M2M device ID starts, the M2M device transmits a link status check request to the BS. After the M2M device transmits the request to the BS, if a response for the request is not received from the BS within a specific time, the M2M device de-allocates its M2M device ID.

Alternatively, if the BS does not receive a signal (or data) from the M2M device during a specific time after starting of the basic available interval of the M2M device, the BS transmits the link status check request signal to the M2M device. After the BS transmits the request to the M2M device, if a response for the request is not received from the M2M device within a specific time, the BS de-allocates the M2M device ID allocated to the M2M device.

In addition, in the explicit method, if there is a need to de-allocate the M2M device ID similarly to a case where the M2M device is powered down, a de-allocation request signal of the M2M device ID is transmitted to the BS. Upon receiving the de-allocation request signal of the M2M device ID from the M2M device, the BS transmits a response signal for the de-allocation request signal to the M2M device.

Thereafter, when the BS receives ACK for the response signal for the de-allocation of the M2M device ID, the BS de-allocates the M2M device ID allocated to the M2M device.

After requesting the BS to de-allocate the M2M device ID, when a response signal for the request is received from the BS, the M2M device transmits ACK for the response to the BS. Thereafter, the M2M device de-allocates the M2M device ID allocated by the BS.

For another example, the BS or the M2M device can de-allocate a corresponding ID after receiving the response signal without having to transmit the ACK for the response signal for a signal for requesting the de-allocation of the M2M device ID.

Definition on Idle Time

Instead of fixing an available interval, if a flexible available interval is used similarly to available interval extension, a case may occur in which M2M devices have the same M2M device ID in the available interval. Therefore, a method for preventing M2M devices from having the same ID at the same time will be described hereinafter.

Figure 9A:
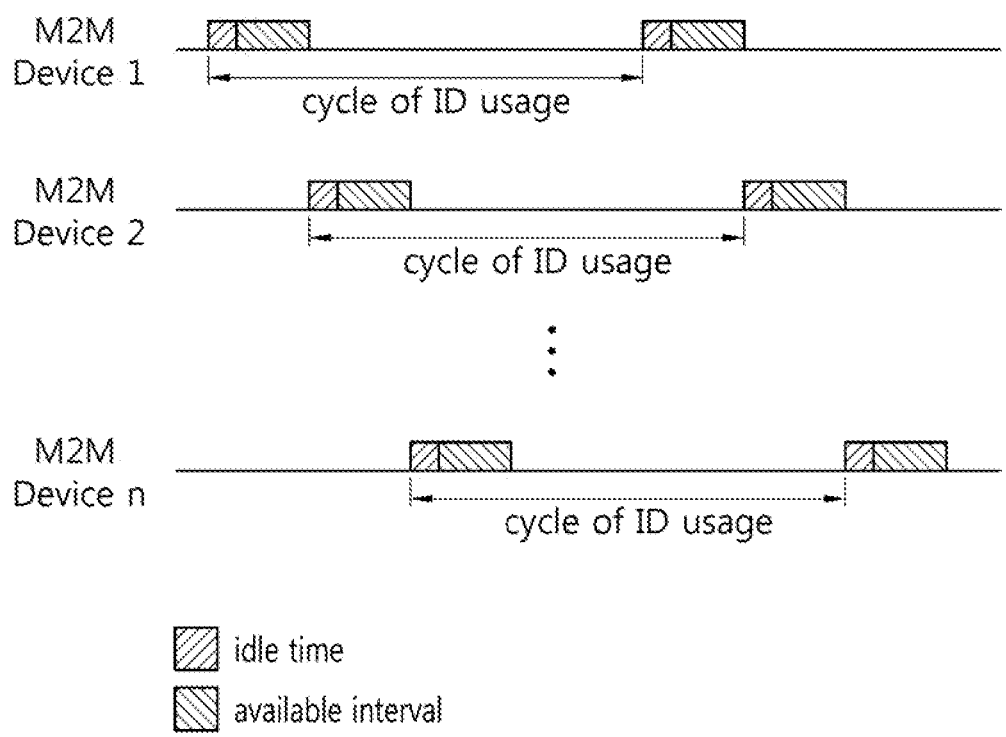
FIG. 9A shows an example in which an idle time exists together with an available interval according to an embodiment of the present invention.

FIG. 9A shows an example in which an idle time exists together with an available interval according to an embodiment of the present invention.

Referring to FIG. 9A, each M2M device has the idle time during a specific duration before an available interval starts. For example, the specific duration may be one frame or one superframe or may be two frames or two superframes.

During the idle time, the M2M device does not communicate with a BS and confirms whether a signal related to extension (e.g., a signal indicating whether the M2M device ID is used by another M2M device) is transmitted from the BS.

As a result of the confirmation, if the M2M device does not receive an extension indication or extension notification from the BS during the idle time, a previously allocated available interval is valid. Herein, according to a signal regarding the use of the M2M device ID and sent by the BS to the M2M device during the idle time, the M2M device may use a next available interval by skipping an available interval following the idle time. Alternatively, the M2M device ID may not be used only during a duration included in the signal related to extension, and the M2M device ID may be used during the remaining available interval.

Herein, the idle time with a fixed size may be present in the first or last portion of a cycle of ID usage. The idle time is located in the first portion of the cycle of ID usage in FIG. 9A.

Figure 9B:
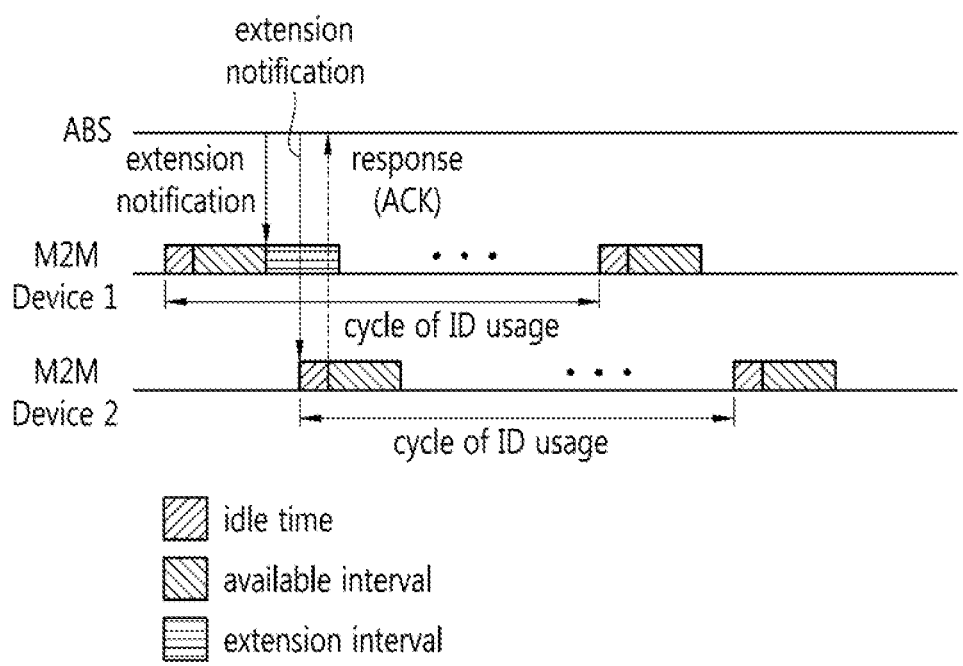
FIG. 9B shows an example of a method of transmitting an extension signal in an idle time according to an embodiment of the present invention.

FIG. 9B shows an example of a method of transmitting an extension signal in an idle time according to an embodiment of the present invention.

An M2M device acquires information indicating whether an M2M device ID is used by a different M2M device in an idle time from a BS before an available interval in which the M2M device ID is used. During the idle time, if the M2M device which intends to use the M2M device ID does not receive from the BS a signal indicating whether the ID is used by the different M2M device, the M2M device uses the ID by determining that the ID can be used during its basic available time following the idle time. Before the termination of the available interval for the M2M device, if the BS needs to extend the available interval for the M2M device, the available interval of the M2M device is extended by transmitting a signal for reporting this to the M2M device. Herein, the M2M device may request the BS to extend the available interval of the M2M device.

Referring to FIG. 9B, if an extended available interval of an M2M device 1 overlaps with a basic available interval of an M2M device 2, a BS transmits to the M2M device 2 a signal for indicating that the M2M device ID is used by the M2M device 1 in an idle time of the M2M device 2 located immediately before an available interval of the M2M device 2.

The signal transmitted by the BS to the M2M device 2 may include information indicating whether the M2M device ID is currently used, information indicating a time in which the M2M device ID is used by a different M2M device, that is, information regarding until when the ID is used, etc. If the M2M device 2 receives from the BS a signal (e.g., MAP, MAC message, header (extended header, signaling header)) regarding whether the M2M device ID is used in the idle time of the M2M device 2, the M2M device 2 determines that the M2M device ID allocated to itself is used by the M2M device 1. In this case, the M2M device 2 transmits to the BS a response for the signal received from the BS. The response may be an ACK signal. The ACK signal may be HARQ ACK or a codeword transmitted through a fast feedback channel.

Figure 9C:
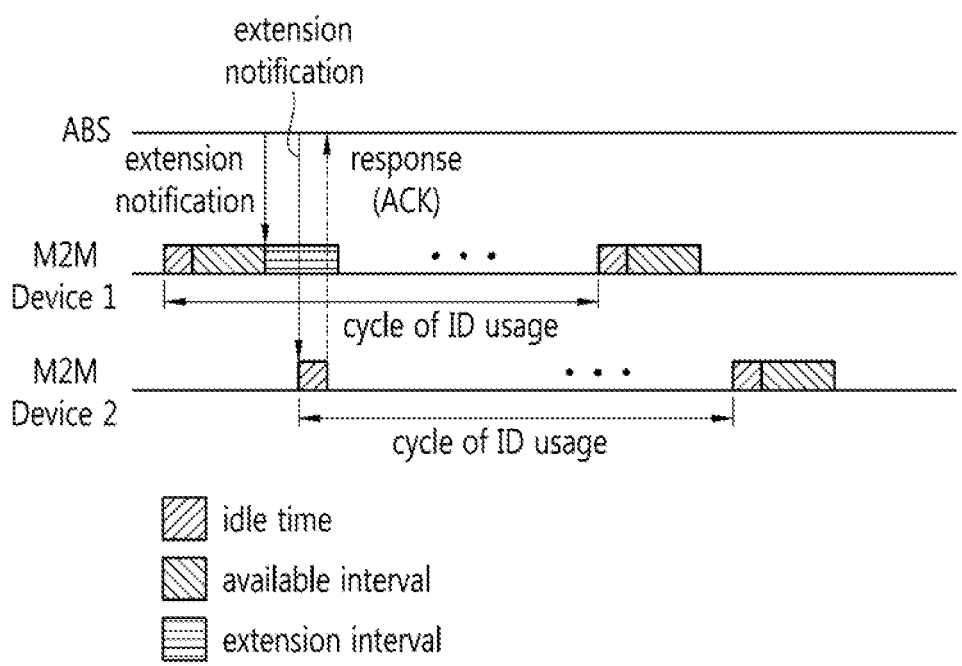
FIG. 9C shows another example of a method of transmitting an extension signal in an idle time according to an embodiment of the present invention.

FIG. 9C shows another example of a method of transmitting an extension signal in an idle time according to an embodiment of the present invention.

Referring to FIG. 9C, if an M2M device 2 receives information indicating that an M2M device ID allocated by a BS in an idle time of the M2M device 2 is used by an M2M device 1, the M2M device 2 may use the M2M device ID by using a next available interval while skipping an available interval following the idle time.

Figure 9D:
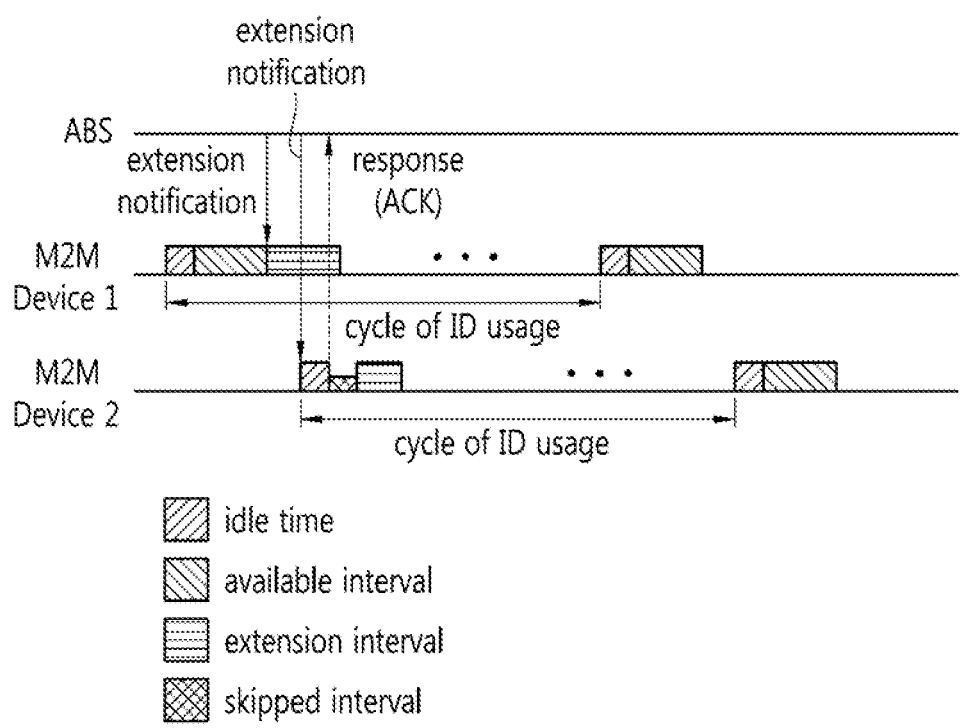
FIG. 9D shows another example of a method of transmitting an extension signal in an idle time according to an embodiment of the present invention.

FIG. 9D shows another example of a method of transmitting an extension signal in an idle time according to an embodiment of the present invention.

Referring to FIG. 9D, if an M2M device 2 receives a signal indicating that an M2M device ID allocated by a BS is used by an M2M device 1, the M2M device 2 does not use the M2M device ID in its available interval only during a duration in which the M2M device 1 extends the use of the M2M device ID. As shown in FIG. 9D, the M2M device 2 does not use the ID during a skipped interval. Thereafter, the M2M device 2 can use the ID in the remaining available interval after the skipped interval is terminated.

Table 5 below shows an example of an AI extension notification A-MAP IE format used by a BS to report an M2M device about that the M2M device ID is used by a different M2M device during an idle time of the M2M device (i.e., that an available interval of the different M2M device is extended). Herein, the BS transmits A-MAP IE to the M2M device only when the M2M device cannot use the ID since an AI of the different M2M device is extended.

TABLE 5

| Syntax | Size (bit) | Notes |
|---|---|---|
| AI_Extension_Notification A-MAP IE( ) { | | |
| A-MAP IE Type | 4 | AI Extension Notification A-MAP IE |
| Action code | 1 | Indicate how long the device idles its available interval upon receiving A-MAP IE. 0: Dose not use ID during the available interval (i.e., a whole basic available interval) after an idle time. 1: Can use ID during the remaining available interval while not using ID only during a determined time included in a determined available interval after the idle time |
| If (Action code= 0b1) { Extension end time | Variable | Indicate until when ID cannot be used within the basic available interval of the device. That is, the device cannot use ID until the basic available |

TABLE 5-continued

| Syntax | Size (bit) | Notes |
|---|---|---|
| } } | | interval is terminated from a corresponding time. |

As described above, information indicating whether the M2M device which receives the extension notification signal cannot use the M2M device ID during the idle time (i.e., the extension end time in Table 5 above) can be delivered to the device not only through the AI_Extension_Notification A-MAP IE but also through another signal.

For example, ID use cycle information and the basic available interval in which the M2M device can use the ID can be delivered in advance to the M2M device by including the extension end time to a signal (i.e., AAI_REG-REQ/RSP, AAI_SBC-REQ/RSP or new MAC control message/header) delivered to the M2M device.

Figure 10A:
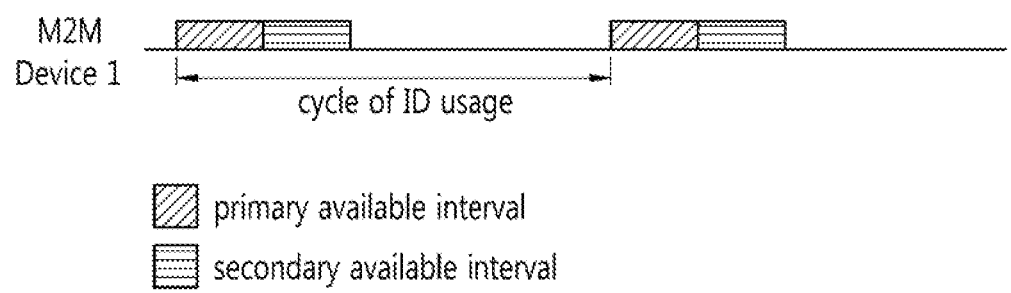
FIG. 10A shows a method of knowing whether an M2M device can use an ID during its available interval according to an embodiment of the present invention.

FIG. 10A shows a method of knowing whether an M2M device can use an ID during its available interval according to an embodiment of the present invention.

Referring to FIG. 10A, a basic available interval is allocated to the M2M device by a BS. Thereafter, the M2M device determines a primary available interval on the basis of the basic available interval, ID use cycle, and ID use offset (for determining a start point of the basic available interval) received from the BS. If the primary available interval is directly followed by a secondary available interval, a size of the available interval becomes equal to that of the basic available interval.

In this case, a resource may be allocated by the BS to the M2M device by using IDs allocated during both of the primary available interval and the secondary available interval. Herein, the primary available interval does not overlap with a primary available interval of a different M2M device, and the secondary available interval does not overlap with a secondary available interval of the different M2M device. Upon receiving MAP in which an ID indicator is set to '0' during the primary available interval, the M2M device determines that the MAP is for the M2M device. If the ID indicator is set to '1' during the secondary available interval, the M2M device determines that the MAP is for the M2M device.

Figure 10B:
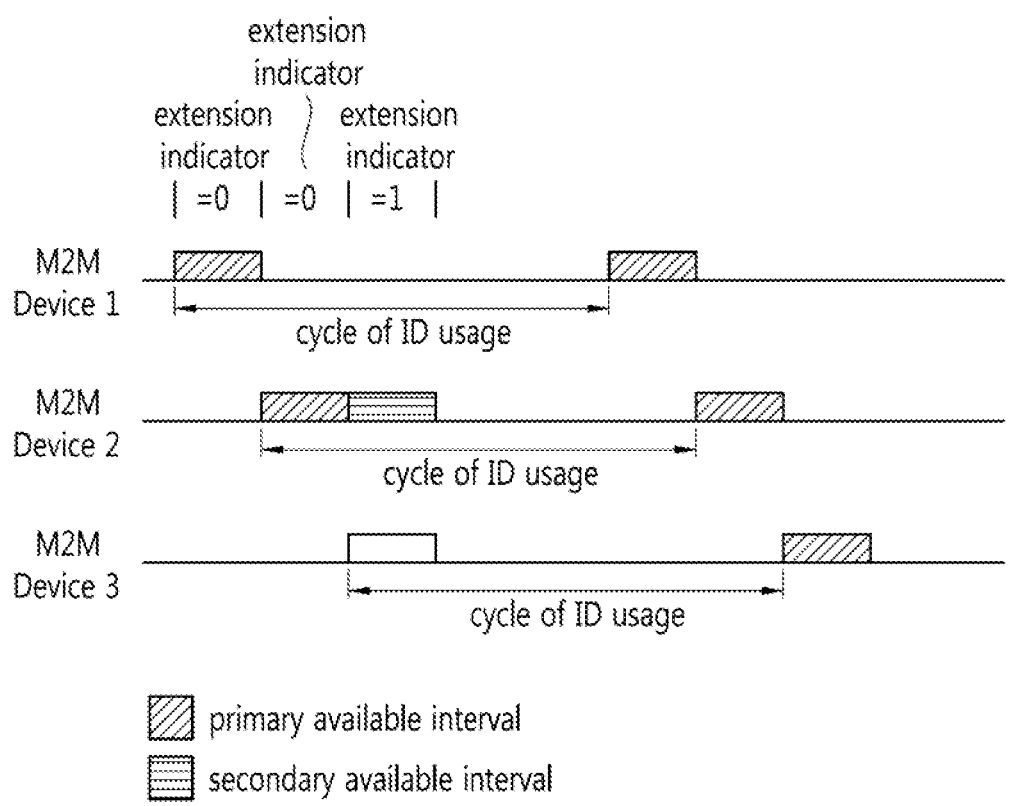
FIG. 10B shows a method of knowing whether an M2M device can use an ID during its available interval according to an embodiment of the present invention.

FIG. 10B shows a method of knowing whether an M2M device can use an ID during its available interval according to an embodiment of the present invention.

Referring to FIG. 10B, an extension indicator indicates whether MAP used during a current available interval is used for a basic available interval or for an extended available interval. For example, the M2M device can know that the current available interval is the basic available interval if the extension indicator is set to '0', and can know that the current available interval is '1' if the extension indicator is set to '1'.

Table 6 below shows an example of an A-MAP IE format including an M2M device ID according to an embodiment of the present invention.

TABLE 6

| Syntax | Size (bit) | Notes |
|---|---|---|
| M2M DL/UL assignment A-MAP IE() { | | |
| A-MAP IE Type | 4 | M2M DL/UL assignment A-MAP IE |
| ID indicator | 1 | 0: Indicate that it is MAP for the device belonging to the primary available interval 1: Indicate that it is MAP for the device belonging to the secondary available interval |
| } | | |

The ID indicator may be CRC-masked together with the M2M device ID when transmitted to the M2M device.

Sharing of M2M Device ID Using Token Ring Mechanism

Hereinafter, a method is described in which, without having to use the aforementioned basic available interval, when an M2M device intends to use an ID shared by several M2M devices, the M2M device transmits an M2M device ID use request to a BS, and when the BS accepts the use request of the M2M device, the M2M device can use the M2M device ID. That is, a method of sharing an M2M device ID by using a token ring mechanism will be described.

Figure 11:
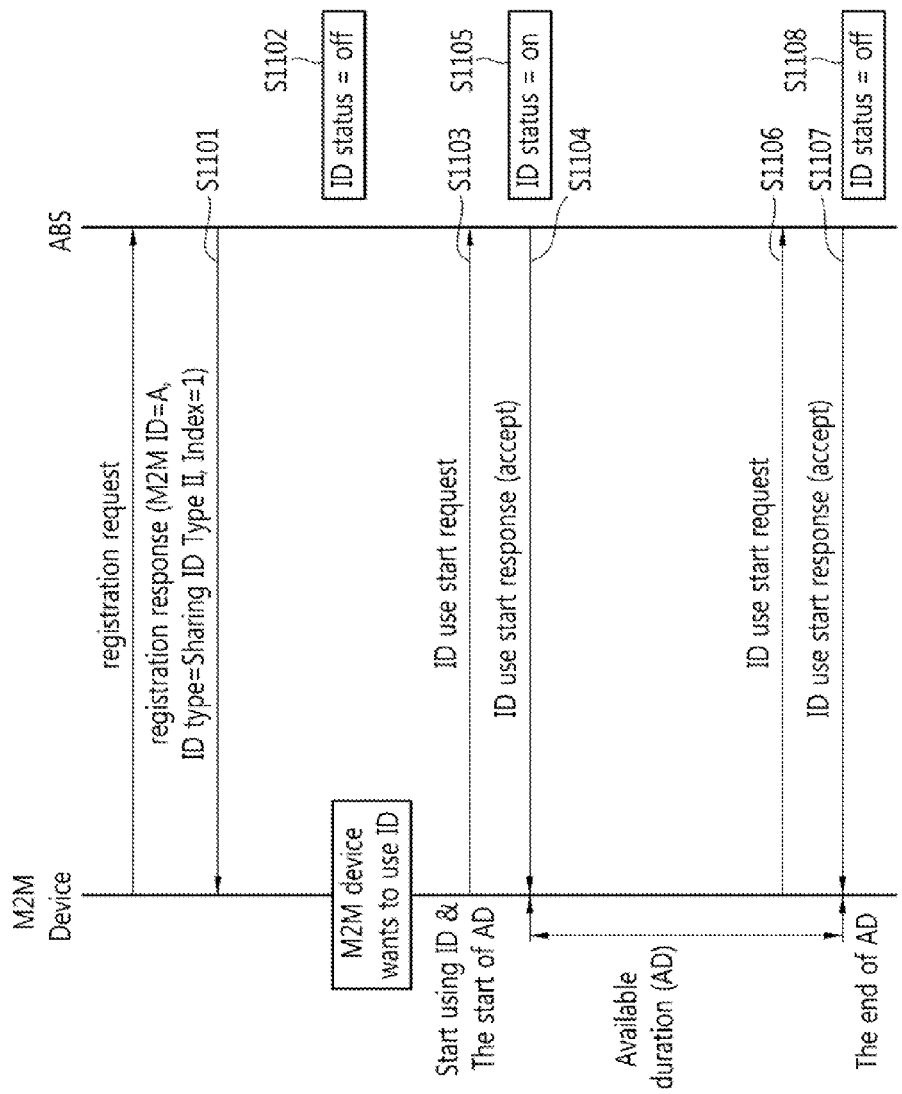
FIG. 11 shows an example of a method of sharing an M2M device ID by using a token ring mechanism according to an embodiment of the present invention.

FIG. 11 shows an example of a method of sharing an M2M device ID by using a token ring mechanism according to an embodiment of the present invention.

Referring to FIG. 11, an M2M device performs a registration procedure with respect to a BS, and thus an M2M device ID is allocated to the M2M device by the BS. That is, the M2M device receives a registration response message including the M2M device ID from the BS. Herein, the M2M device ID can be allocated by the BS through not only the registration procedure but also another network entry procedure or a unicast MAC message, a header, etc.

If the BS allocates the M2M device ID to the M2M device, a type of the M2M device ID is reported to the M2M device. That is, the registration response message further includes type information of the M2M device ID (step S1101). Referring to FIG. 11, the type of the M2M device ID is sharing ID type II, and the M2M device shares the M2M device ID(=A) with several M2M devices. If the M2M device desires to use the shared M2M device ID(=A), the M2M device may transmit an ID use start request to the BS, and may use the M2M device ID by receiving a response for accepting the ID use from the BS.

That is, if the M2M device desires to use the ID, the M2M device transmits a signal for requesting the start of using the M2M device ID to the BS (step S1103). The BS transmits a response signal for the request signal to the M2M device. In this case, if the M2M device ID is not used by a different M2M device (i.e., if an ID status is 'Off') (step S1102), the BS transmits the response signal by including request acceptance information to the M2M device (step S1104). Thereafter, the BS sets the status of the M2M device ID to 'On' (step S1105). Herein, if the status of the M2M device ID is 'On', it implies that the ID is used by the different M2M device. Therefore, if there is an ID use start request from the different M2M device, the BS does not accept the ID usage request for the different M2M device.

Upon receiving a response signal indicating 'accept' for the request from the BS, the M2M device starts an available duration (or available interval) for the ID. After the M2M device completely uses the ID, the M2M device transmits an ID use termination request signal to the BS to return the M2M device ID (step S1106).

Upon receiving the ID use termination request signal from the M2M device, the BS transmits a response thereof to the M2M device (step S1107), and sets the ID status to 'Off' (step S1108). From this point, the BS can accept the ID request of the different M2M device when there is the ID use start request for the different M2M device.

In addition, the BS may allocate an index to each M2M device in order to know to which M2M devices a sharing ID is allocated. That is, the BS can also transmit the index to the M2M device when allocating the M2M device ID.

A method described hereinafter is for determining a time for using an M2M device ID, that is, how long the M2M device ID will be used, when an M2M device ID use request of an M2M device is accepted by a BS.

First, there may be two methods, i.e., an implicit method using a global variable value and a timer and an explicit method using message transmission and reception.

The implicit method may use a global variable of an available duration and a timer.

In the method of using the global variable of the available duration (AD), a BS and an M2M device have a valid duration of the AD as a global value. Thus, after accepting an ID use start request from the BS, an M2M device ID is valid for the M2M device to an extent defined by the global variable.

Next, in the method of using the timer, the BS and the M2M device use a corresponding ID during a specific time, and if there is no transmitted and received traffic, the M2M device disables the allocated ID, and the BS sets an ID use status to "Off".

Since the BS reports the device about how long the ID is valid, the available duration is valid for the device and the BS during a determined time, and the device and the BS can know the available duration of the device even if the device does not send an ID use end signal to the BS.

Next, the explicit method can use the following mechanisms.

1 Acquisition Using System Configuration Messages

A BS transmits an available duration to an M2M device by using a system information delivery signal or message (e.g., SFHs, SCD message, or ID related broadcast message). Thereafter, the M2M device configures an AD value by using the received information.

2. Acquisition Using Registration Procedure

When the BS allocates the M2M device ID to the M2M device by using a registration response message (i.e., AAI_REG-RSP), the BS may report an available duration to the M2M device. Next, if the BS accepts a request of using the M2M device ID of the M2M device, the M2M device uses the AD value.

3. Acquisition Using Message Transmitted to M2M Device in Network Entry

In addition to the registration response message (i.e., AAI_REG-RSP) described in the clause 2 above, the BS transmits an available duration value to the M2M device by using other unicast messages (e.g., AAI_RNG-RSP, AAI_SBC-RSP, AAI_PKM-RSP, etc.) delivered to the device in network entry. Accordingly, the M2M device can properly configure the available duration.

4. Acquisition Using New ID Related Unicast Message after Network Entry

After network entry, when the BS delivers a unicast message for delivering information related to M2M device ID allocation to the M2M device, an available duration value may be included. The M2M device receives the available duration value through the unicast message and thereafter operates by properly configuring the available duration.

5. An available duration is reported when the BS transmits (or accepts) a response for an ID use request. Referring to FIG.-(a), when the BS transmits the response for the ID use request, the BS transmits the response by including the AD use duration information. That is, when the BS sends an acceptance response for the ID use start request of the device, available interval information may be included in the response message so that the BS reports the device about until when the ID is used.

6. Termination Signaling

The M2M device or the BS may explicitly report ID use termination. After the BS and the M2M device transmit and receive the termination signaling, the M2M device disables the use of M2M device ID, and the BS changes the ID status to 'OFF'.

Figure 12A:
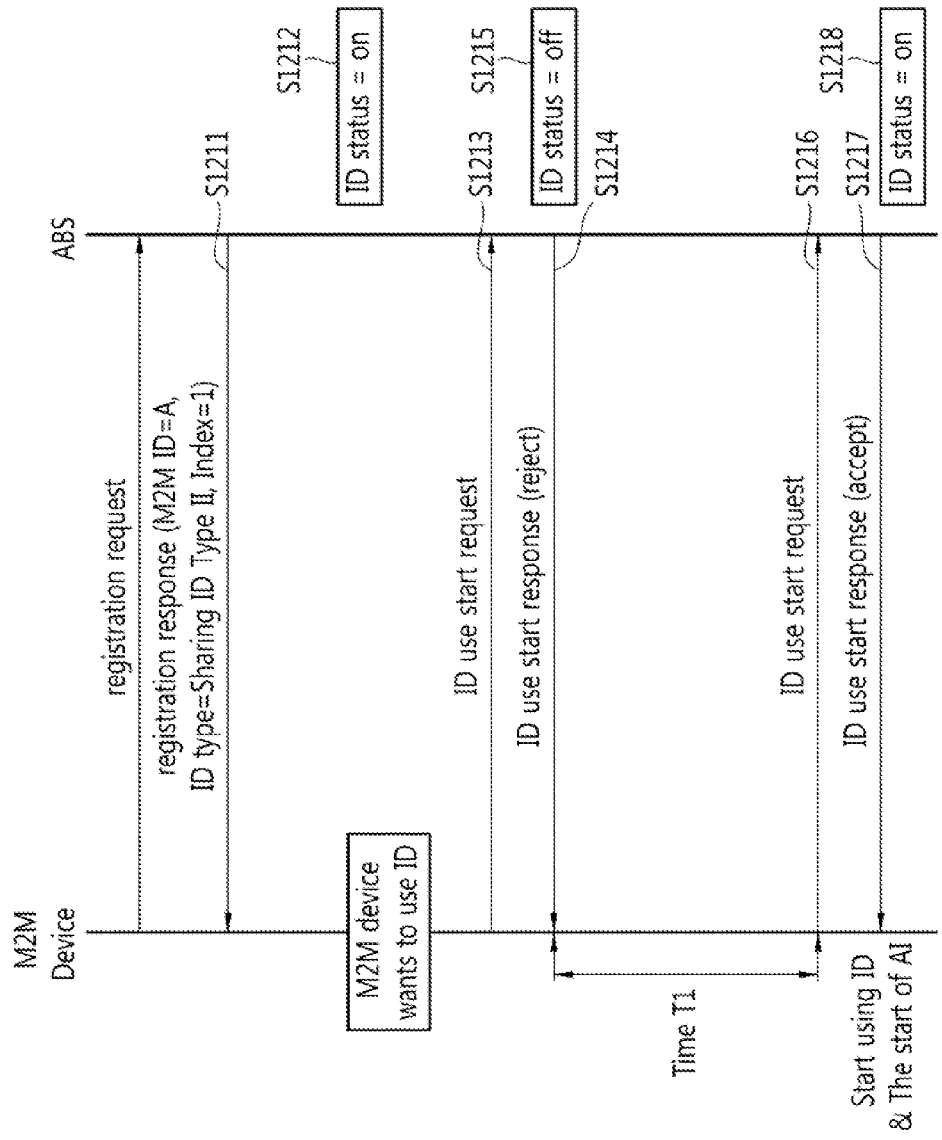
FIG. 12A shows an example of a method of using an M2M device ID in a case where an M2M device transmits an ID use start request when an ID status is 'On' according to an embodiment of the present invention.

FIG. 12A shows an example of a method of using an M2M device ID in a case where an M2M device transmits an ID use start request when an ID status is 'On' according to an embodiment of the present invention.

Detailed descriptions on steps S1211 to S1213 will be omitted since the steps are identical to steps S1101 to S1103.

When a BS receives an ID use start request from the M2M device (step S1213), if an ID status is 'On' (i.e., if another M2M device uses a corresponding ID) (step S1212), the BS rejects the ID use request (step S1214). Referring to FIG. 12A, if the M2M device transmits the ID use start request signal to the BS and thereafter receives a rejection message from the BS, the ID use start is requested again to the BS after a determined duration (e.g., after T1 expires). If the ID status is changed to 'Off' during T1 (step S1215), when a next ID use start request is received (step S1216), the BS sends a positive response for the ID use start request to the device (step S1217), and sets the ID status to 'On' (step S1218).

The value T1 is a time consumed until the M2M device ID use start request is transmitted again to the BS after the M2M device receives a rejection to the M2M device ID use start request from the BS.

Hereinafter, a method of setting a value T1 by an M2M device will be described.

1. Set to a Global System Value:

The value has already been equally set in a system. When the M2M device receives 'reject' from a BS, an ID use start request is transmitted again to the BS after a time T1 elapses by using the global system value T1.

2. Acquisition Using System Configuration Messages:

The value T1 is transmitted to the M2M device by using a system information delivery signal or message (e.g., SFHs, SCD message, or ID related broadcast message), and the M2M device sets the value T1 by using information received through the message.

3. Transmitted to the M2M Device by the BS in ID Allocation

When the M2M device ID is allocated to the M2M device (e.g., by using a registration response message (AAI_REG-RSP)), the BS transmits the allocated M2M ID and the value T1 to the M2M device. Therefore, the M2M device can properly set the value T1.

4. Transmitted to the M2M Device Through a Message Delivered to the Device in Network Entry The BS delivers the value T1 to the M2M device by using unicast messages (e.g., AAI_RNG-RSP, AAI_SBC-RSP, AAI_PKM-RSP, etc.) delivered to the device in another network entry other than AAI_REG-RSP, and the M2M device can properly set the value T1.

5. Transmitted to the M2M Device Through a New ID Related Unicast Message after Network Entry After network entry, when the BS delivers to the M2M device a unicast message for delivering information related to ID allocation, the message can be transmitted to the M2M device by including the value T1. The M2M device receives the value T1 through the unicast message, and thereafter operates by properly setting the value T1.

6. Transmitted by Including the Value T1 to a Response Signal for the ID Use Start Request When the BS sends a rejection message for the ID use start request, the message is transmitted by including the value T1, and the M2M device sets the value T1 by using information T1 included in the rejection message.

Figure 12B:
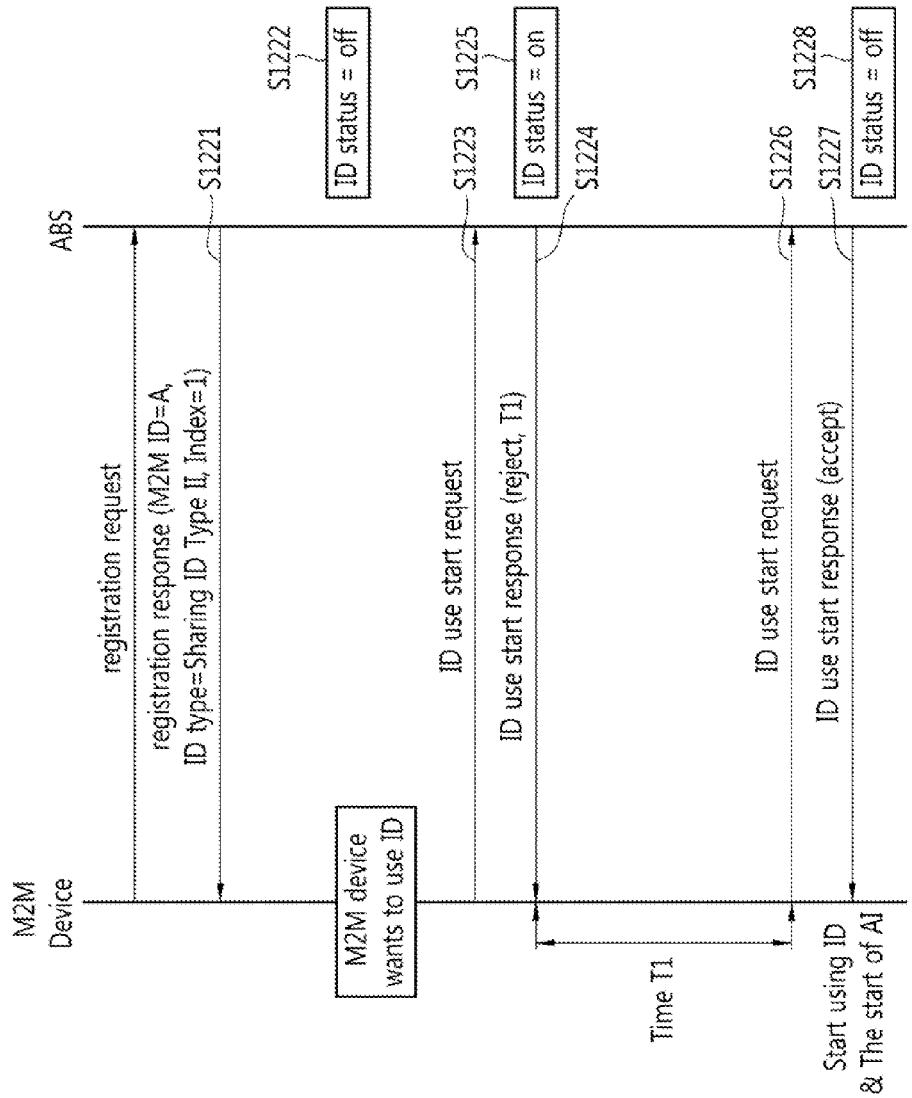
FIG. 12B shows an example of a method in which, when transmitting a response for an M2M device ID use request, the message is transmitted by including information T1 of an M2M device according to an embodiment of the present invention.

FIG. 12B shows an example of a method in which, when transmitting a response for an M2M device ID use request, the message is transmitted by including information T1 of an M2M device according to an embodiment of the present invention.

Detailed descriptions on steps S1221 to S1223 will be omitted since the steps are identical to steps S1101 to S1103.

If a BS can send to the M2M device an acceptance message for the ID use request by including an available duration, the BS can know until when the M2M device uses the ID. Therefore, as shown in FIG. 12B, the BS may report the M2M device about when the M2M device will request again the ID use, by including a value T1 to a rejection message for the M2M device ID use start request (step S1224). Therefore, the M2M device may transmit again the ID use request message to the BS by using information included in the rejection message (step S1226). In this case, when the M2M device requests again the M2M device ID use, the BS may set the value T1 so that an ID use start request message is sent at a different time for each M2M device which transmits a rejection signal in order to reduce collision among the M2M devices.

In addition, the M2M device ID use start request signal may be a ranging code mapped to the ID. That is, each sharing ID may be 1:1 mapped to a specific ranging code. Upon receiving the ranging code for the sharing ID from the M2M device, the BS transmits a ranging response as a response signal. Herein, instead of the AAI_RNG-RSP message, another MAC message may be used.

The BS transmits a response signal indicating acceptance to the request from the M2M device (step S1227), changes the ID status to 'On' (step S1228).

Table 7 below shows an example of a ranging response message (AAI_RNG-RSP message) format including a value T1 according to an embodiment of the present invention.

TABLE 7

| Syntax | Size (bit) | Notes |
| --- | --- | --- |
| AAI_RNG-RSP message ( ) { | | |
| Message Type | 4 | AAI_RNG-RSP message |
| Ranging code | | |
| Ranging opportunity | | |
| Action code | 1 | 0: Accept<br>1: Reject |
| If (action code == 0) { | | |
| Available interval | | Indicate time information regarding until when ID is used by the device. This information may be expressed by an absolute value, that is, may indicate a frame number at which an available interval is terminated. |
| } else { | | |
| Time T1 | | T1: Indicate until when ID cannot be used. This value |

TABLE 7-continued

| Syntax | Size (bit) | Notes |
| --- | --- | --- |
| | | indicates an absolute value (i.e., a frame number) or a relative value (i.e., an offset from a current time) |
| } | | |
| } | | |

A method of transmitting an ID use start request by an M2M device to a BS only when an ID status of the BS is 'Off' will be described hereinafter.

The BS periodically transmits to the M2M device whether the M2M device ID of the M2M device is currently used by using a corresponding ID. On the basis of ID status information periodically transmitted by the BS, the M2M device transmits an ID use start request message to the BS only when the ID status is 'Off'. If it is determined that the ID status is 'On' through the message periodically transmitted by the BS, the M2M device waits until next ID status information is delivered from the BS. Herein, the periodic message for carrying the ID status can be delivered to the M2M device in a multicast or broadcast manner. When transmitted in a multicast manner for each ID, a transmitted message or CRC of a control channel for allocating the message may be transmitted by being masked to a corresponding ID, and a transmission time or period may differ for each multicast group. When transmitted in a multicast manner, information indicating the ID status can be carried for each group by allowing one multicast group to include several IDs, and each group may have a different period. When transmitted in a broadcast manner, ID status information for each ID is transmitted by being included in one message.

Herein, a period for transmitting the ID status by the BS may be transmitted to the M2M device by using one of three methods: 1) a method of transmitting the period when an ID is allocated during a registration procedure; 2) a method of delivering an ID status message transmission period to the device by using a message of delivering information related to ID allocation after network entry; 3) a method of transmitting the period to devices by using a general system information delivery message (i.e., SCD, SFH) or a broadcast message for delivering information related to ID allocation.

Figure 13A:
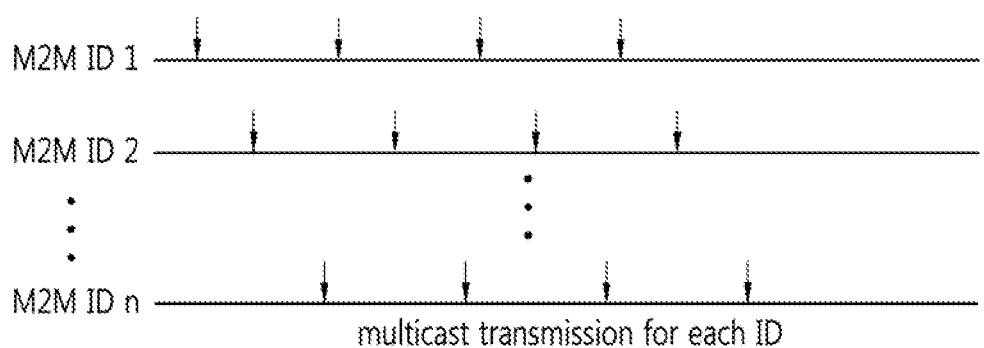
FIG. 13A to FIG. 13C show an example of a method of transmitting M2M device ID status information according to an embodiment of the present invention.
Figure 13B:
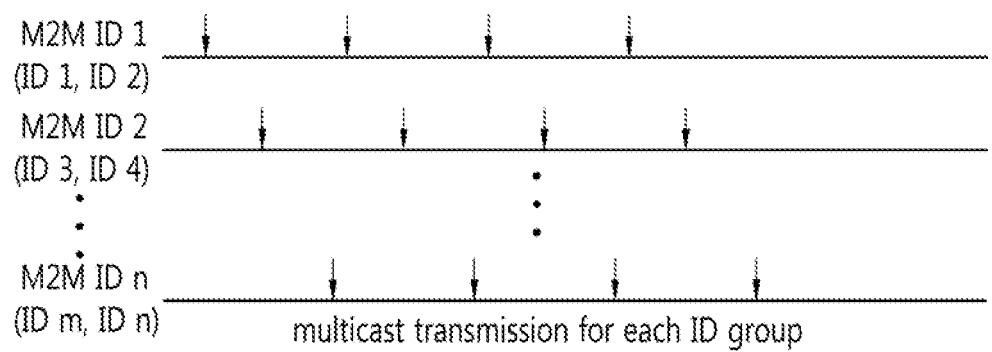
Figure 13C:
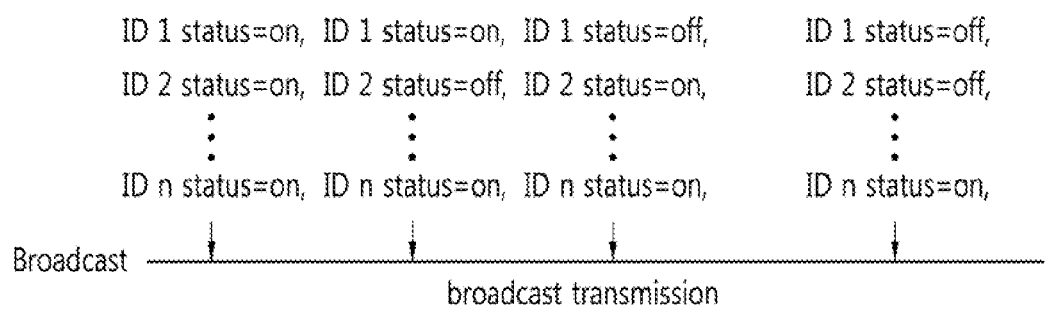

FIG. 13A to FIG. 13C show an example of a method of transmitting M2M device ID status information according to an embodiment of the present invention.

Referring to FIG. 13A, a BS multicasts M2M device ID status information to an M2M device for each M2M device ID. Referring to FIG. 13B, a BS multicasts M2M device ID status information for each ID group. Referring to FIG. 13C, a BS broadcasts M2M device ID status information by including all pieces of M2M device ID status information to one message.

Figure 14A:
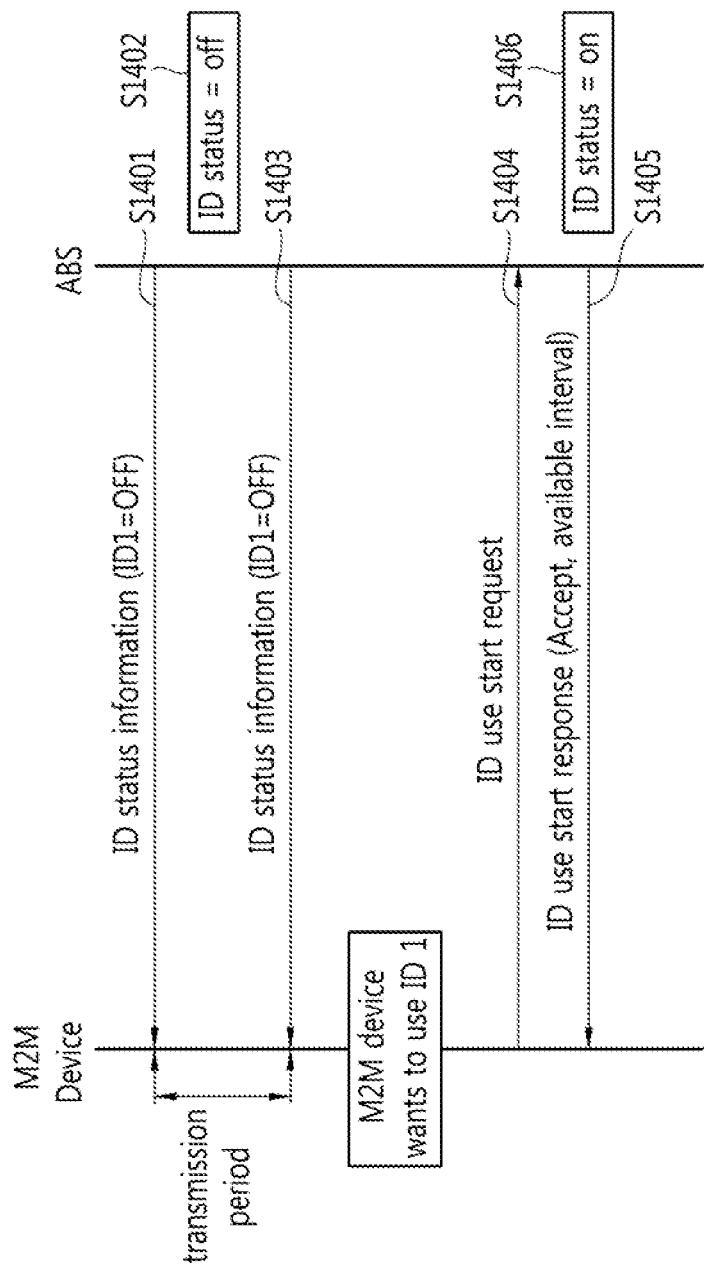
FIG. 14A shows a signal transmission method for an M2M device ID use start request by receiving ID status information according to an embodiment of the present invention.

FIG. 14A shows a signal transmission method for an M2M device ID use start request by receiving ID status information according to an embodiment of the present invention.

Referring to FIG. 14A, an M2M device receives ID status information indicating that a status of an ID 1 is 'Off' from a BS. Herein, the ID status information is periodically transmitted according to a transmission period (steps S1401 to S1403).

Since the ID status received from the BS is 'Off', the M2M device transmits an ID use start request signal to the BS when the M2M device intends to use the ID 1 (step S1404). Thereafter, the M2M device receives a response signal indicating acceptance to the request signal and including available duration information of the ID 1 from the BS (step S1405). In this case, the BS sets the statue of the ID 1 to 'On' so that another M2M device cannot use the ID 1 (step S1406).

Figure 14B:
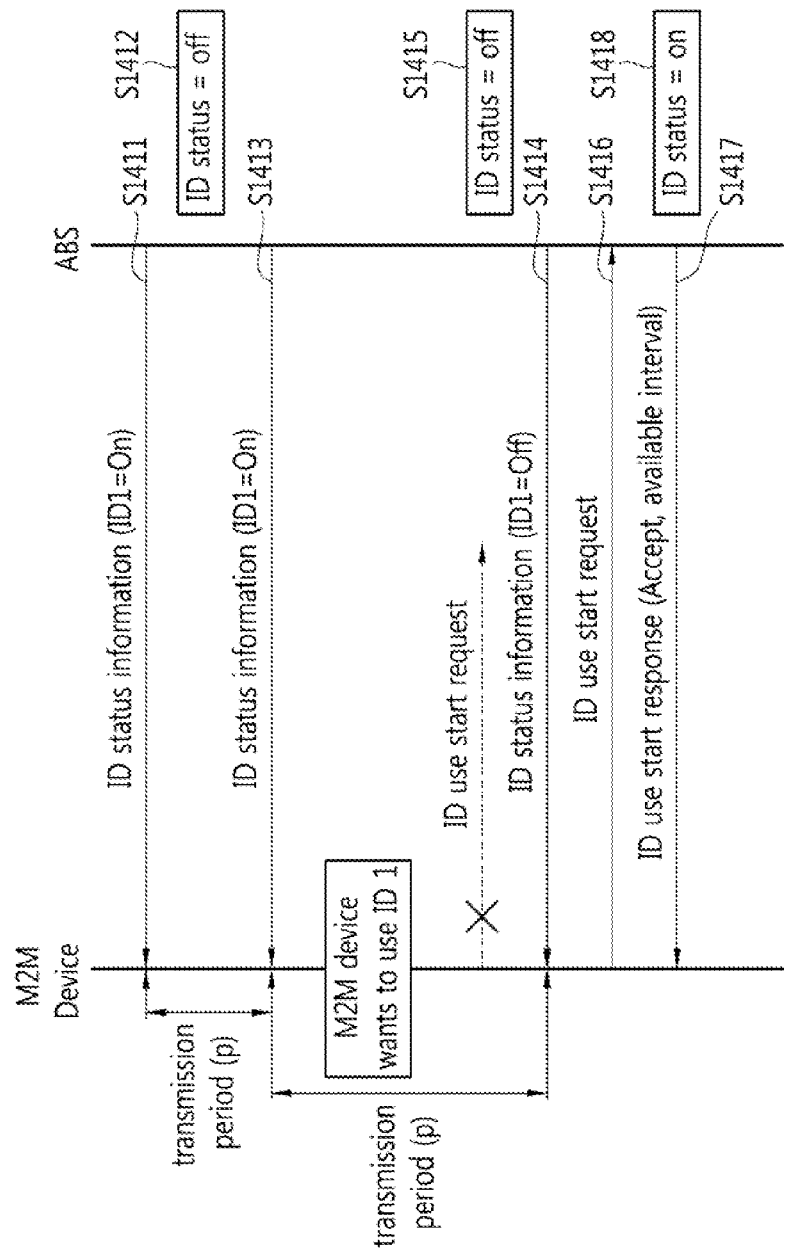
FIG. 14B shows another example of a signal transmission method for an M2M device ID use start request by receiving ID status information according to an embodiment of the present invention.

FIG. 14B shows another example of a signal transmission method for an M2M device ID use start request by receiving ID status information according to an embodiment of the present invention.

Detailed descriptions on steps S1416 to S1418 will be omitted since the steps are identical to steps S1404 to S1406.

Referring to FIG. 14B, if an M2M device receives ID status information indicating that an ID status is 'On' from a BS, the M2M device does not transmit an ID use start request signal to the BS until receiving next ID status information from the BS.

That is, the M2M device determines whether to transmit the ID use start request signal by using ID status information transmitted from the BS in a next cycle. Referring to FIG. 14B, the ID status transmitted next from the BS is 'Off' (steps S1411 to S1415).

Figure 14C:
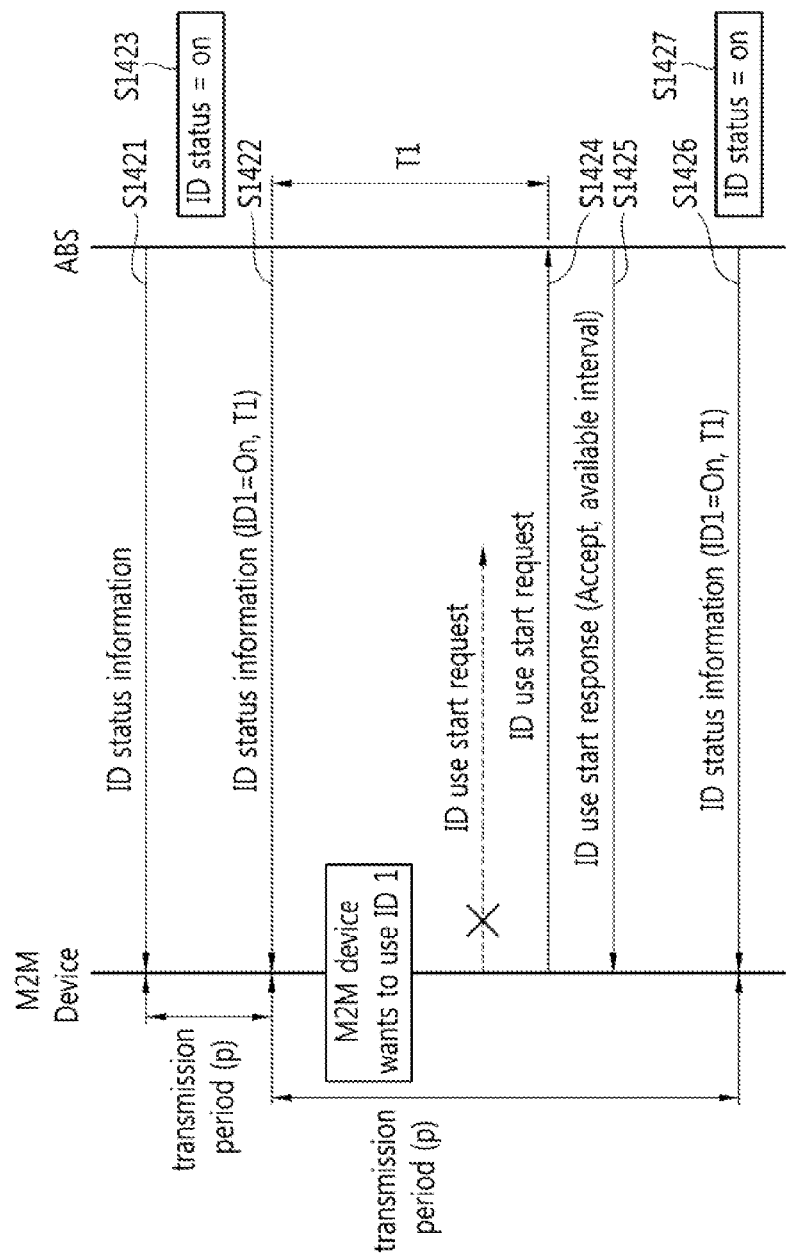
FIG. 14C shows a method of transmitting an ID use start request signal of an M2M device by receiving ID status information and ID use time information of another M2M device according to an embodiment of the present invention.

FIG. 14C shows a method of transmitting an ID use start request signal of an M2M device by receiving ID status information and ID use time information of another M2M device according to an embodiment of the present invention.

Referring to FIG. 14C, a BS periodically transmits ID status information to the M2M device. A transmission interval of the ID status information is determined by a transmission period p. The transmission period value is received from the BS, and may be included when transmitting the ID status information.

If the ID status is 'On', that is, if a different M2M device uses the ID, the BS transmits a message including the ID status information by including information indicating an available time of the ID (or a use time of the ID of the different M2M device), that is, information indicating until when the same ID allocated to M2M devices is reserved (or used) by the different M2M device (steps S1421 to S1423).

If the ID status is 'On', the M2M device acquires time information T1 regarding until when the ID in use included in a corresponding signal is used by the different M2M device (step S1422). Thereafter, by using the information T1, the M2M device waits until the time T1, and then transmits an ID use start request signal to the BS (step S1424). That is, the information T1 indicates time information indicating until when the ID in use is used by the different M2M device or time information indicating a specific time after which the ID use start request will be sent by the device. For example, the time information can be expressed in a unit of frame, subframe, and superframe.

Thereafter, the BS transmits to the M2M device a response signal for the start request signal of the M2M device. The response signal includes operation code information indicating acceptance to the use of the M2M device ID and available duration information for the ID (step S1425). Thereafter, the device may repeat the aforementioned operations (steps S1426 and S1427).

Table 8 below shows an example of an ID status advertisement message (i.e., ID-STATUS-ADV message) format according to an embodiment of the present invention.

TABLE 8

| Syntax | Size (bit) | Notes |
|---|---|---|
| AAI_ID-STATUS-ADV message ( ) { | | |

TABLE 8-continued

| Syntax | Size (bit) | Notes |
|---|---|---|
| Message Type | 4 | AAI_ID-STATUS-ADV message |
| Number of sharing ID (n) | TBD | Total number of sharing IDs allocated by BS |
| For (i=0; i<n; i++) { | | |
| M2M device ID | TBD | Indicate a sharing M2M device ID allocated to the device |
| ID status | 1 | Indicate whether ID is used by another device. 0: Off 1: On |
| If (ID status ==1) { | | |
| Time T1 | TBD | T1: Indicate until when ID cannot be used. This value indicates an absolute value (i.e., a frame number) or a relative value (i.e., an offset from a current time) |
| } } } | | |

Table 8 above shows an example of a message format by which the BS periodically transmits ID status information, and a message may be a broadcast message. Herein, the ID status information may be transmitted to the M2M devices in a format of not only a broadcast message but also an A-MAP IE. In addition, the message includes information indicating the number of sharing IDs.

In addition, the value T1 may indicate a termination time or a timer value for actual termination.

What is claimed is:

1. A method in which a machine to machine (M2M) device transmits/receives data to/from a base station in a wireless communication, the method comprising:
receiving from the base station a first message including an available interval for an M2M device identifier (ID) shared among M2M devices and an M2M device ID use cycle indicating a duration in which the available interval is periodically repeated; and
transmitting/receiving data to/from the base station by using the M2M device ID in the available interval.

2. The method of claim 1, further comprising allocating the M2M device ID by the base station.

3. The method of claim 2, wherein the first message is received from the base station when the M2M device ID is allocated by the base station.

4. The method of claim 1, wherein the first message is received through an initial network entry procedure performed with respect to the base station, and is a registration response (REG-RSP) message or a subscriber station basic capability negotiation response (SBC-RSP) message.

5. The method of claim 1, wherein the first message further includes offset information indicating a use start time of the M2M device ID.

6. The method of claim 5, further comprising:
determining a primary available interval and a secondary available interval on the basis of the received first message; and
receiving a MAP IE including an M2M device ID indicator by using at least one of the determined primary available interval and secondary available interval,
wherein the M2M device ID indicator is information indicating that the MAP IE is for an M2M device belonging to the primary available interval or an M2M device belonging to the secondary available interval.

7. The method of claim 1, wherein the M2M device ID use cycle consists of an available interval and an unavailable interval of the M2M device ID.

8. The method of claim 7, further comprising receiving a signal for reporting the start of the available interval of the M2M device ID from the base station in the unavailable interval,
wherein the signal for reporting the start of the available interval includes information indicating the available interval of the M2M device ID and a type of the available interval.

9. The method of claim 7, further comprising:
transmitting a signal for requesting the start of using the M2M device ID to the base station in the unavailable interval; and
receiving a response signal for the request from the base station.

10. The method of claim 9, wherein the response signal further includes response code information indicating rejection or acceptance to the request.

11. The method of claim 10, wherein if the response signal indicates the rejection to the request, the response signal further includes information indicating any one of a connected mode, a sleep mode, and an idle mode until a next response signal is transmitted.

12. The method of claim 11, wherein if the response signal indicates any one of the sleep mode and the idle mode, the response signal further includes information indicating a transmission time of the next-transmitted response signal.

13. The method of claim 10, wherein if the response signal indicates the acceptance to the request, the response signal further includes the available interval of the M2M device ID, a start time of the available interval and type information of the available interval.

14. The method of claim 1, wherein the available interval is classified into a Type-1 available interval indicating a fixed-sized available interval and a Type-2 available interval indicating a flexible-sized available interval.

15. The method of claim 1, wherein the available interval consists of a basic available interval and an extended available interval.

16. The method of claim 1, further comprising terminating the available interval, wherein the available interval is terminated after a pre-set time expires or when a second message indicating the termination of the available interval is received from the base station.

17. The method of claim 1, further comprising receiving a signal indicating extension of the available interval from the base station.

18. The method of claim 17, wherein the extension indication signal or the response signal for the extension request signal includes information indicating a termination time of the extended available interval.

19. The method of claim 1, further comprising:
transmitting a signal for requesting the extension of the available interval to the base station; and
receiving a response signal for the extension request signal from the base station.

20. The method of claim 1, further comprising:
transmitting a link status check request signal for requesting the de-allocation of the M2M device ID to the base station in the available interval; and
de-allocating the M2M device ID in the available interval.

21. The method of claim 20, further comprising receiving a response signal for the link status check request signal from the base station.

22. The method of claim 1, further comprising receiving an available interval (AI) extension notification A-MAP information element (IE) from the base station by using an idle time located before or after the M2M device ID use cycle.

23. The method of claim 22, wherein the AI extension notification A-MAP IE further includes operation code information indicating whether the M2M device ID is used during a part or entirety of the available interval.

24. The method of claim 23, wherein if the operation code information indicates that the M2M device ID cannot be used during the part of the available interval, the AI extension notification A-MAP IE further includes extension end time information indicating an interval in which the M2M device ID cannot be used.

25. A method in which a machine to machine (M2M) device transmits/receives data to/from a base station in a wireless communication, the method comprising:
receiving from the base station a registration response (REG-RSP) message including an M2M device identifier (ID) shared among M2M devices and type information of the M2M device ID;
transmitting to the base station a first message for requesting the start of using the M2M device ID; and
receiving from the base station a second message including operation code information for indicating acceptance or rejection to the first message.

26. The method of claim 25, wherein if the operation code information indicates the acceptance, the second message includes available interval information of the M2M device ID.

27. The method of claim 25, wherein if the operation code information indicates the rejection, the second message includes information indicating a time at which the M2M device ID cannot be used.

28. The method of claim 25, further comprising receiving from the base station a third message including M2M device ID status information indicating whether the M2M device ID is used by a different M2M device.

29. The method of claim 28, wherein the third message is periodically broadcast.

30. The method of claim 28, wherein if the M2M device ID status information indicates that the M2M device ID is currently used by the different M2M device, the third message includes information indicating a time at which the M2M device ID cannot be used.

31. The method of claim 28, wherein the M2M device ID status information is multicast for each M2M device ID or for each M2M device ID group.

* * * * *